US012591915B2

(12) United States Patent
Jiang et al.

(10) Patent No.: US 12,591,915 B2
(45) Date of Patent: Mar. 31, 2026

(54) METHODS AND SYSTEMS FOR DETERMINING RECOMMENDATIONS BASED ON REAL-TIME OPTIMIZATION OF MACHINE LEARNING MODELS

(71) Applicant: Capital One Services, LLC, McLean, VA (US)

(72) Inventors: Cheng Jiang, McLean, VA (US); Yun Zhou, McLean, VA (US); Christy Purnadi, McLean, VA (US); Abhishek Tewari, McLean, VA (US); Seyed Hossein Zahed Zahedani, McLean, VA (US); Ryan Sralla, McLean, VA (US); Yasong Zhou, McLean, VA (US); Brian McGill, McLean, VA (US); Gavin Olson, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 1342 days.

(21) Appl. No.: 17/207,554

(22) Filed: Mar. 19, 2021

(65) Prior Publication Data

US 2022/0301020 A1    Sep. 22, 2022

(51) Int. Cl.
*G06N 20/20* (2019.01)
*G06Q 30/0201* (2023.01)
(Continued)

(52) U.S. Cl.
CPC ......... *G06Q 30/0282* (2013.01); *G06N 20/20* (2019.01); *G06Q 30/0206* (2013.01);
(Continued)

(58) Field of Classification Search
CPC ........... G06Q 30/0282; G06Q 30/0206; G06Q 30/0643; G06N 20/20; G06N 5/01; G05B 2219/33148; G05B 2219/33334
See application file for complete search history.

(56) References Cited

U.S. PATENT DOCUMENTS 10,664,861 B1    5/2020  Kim et al.
10,805,384 B1 *  10/2020 Kutuzov ............... H04L 67/101
(Continued)

FOREIGN PATENT DOCUMENTS

CA       3028646 A1    6/2019
WO     2019088972 A1    5/2019

OTHER PUBLICATIONS

Shahbazi, Zeinab, et al. "Product recommendation based on content-based filtering using XGBoost classifier." Int. J. Adv. Sci. Technol 29 (2019): pp. 6979-6988. (Year: 2019).*
(Continued)

*Primary Examiner* — Omar F Fernandez Rivas
*Assistant Examiner* — Michael C. Lee
(74) *Attorney, Agent, or Firm* — Foley & Lardner LLP

(57) ABSTRACT

Methods and systems are described for improvements to the use of distributed computer networks. For example, conventional systems may rely on the distribution of network or application traffic across multiple servers and may maintain load balancers to maintain that distribution in an efficient manner. Each load balancer may sit between client devices and backend servers, receiving and then distributing incoming requests to any available server capable of fulfilling them. The load balancers may ensure that no one server is overworked based on the number of processing requests directed to that server, which could degrade performance.

17 Claims, 12 Drawing Sheets

(51) Int. Cl.
G06Q 30/0282 (2023.01)
G06Q 30/0601 (2023.01)

(52) U.S. Cl.
CPC ................... G06Q 30/0643 (2013.01); *G05B*
*2219/33148* (2013.01); *G05B 2219/33334*
(2013.01)

(56) References Cited

U.S. PATENT DOCUMENTS

| | | | |
|---|---|---|---|
| 2013/0290110 A1* | 10/2013 | LuVogt ............... | G06F 16/9535 |
| | | | 705/14.66 |
| 2015/0178637 A1* | 6/2015 | Bogojeska .............. | G06N 5/04 |
| | | | 706/12 |
| 2017/0177965 A1* | 6/2017 | Gordo Soldevila ......................... | |
| | | | G06V 30/18057 |
| 2018/0005130 A1 | 1/2018 | Dong et al. | |
| 2018/0218426 A1 | 8/2018 | Vaya et al. | |
| 2018/0336463 A1* | 11/2018 | Bloom ..................... | G06N 3/08 |
| 2019/0163985 A1 | 5/2019 | Wang et al. | |
| 2019/0268241 A1* | 8/2019 | Bifulco .................. | G06N 3/045 |
| 2020/0005196 A1* | 1/2020 | Cai ........................ | G06N 20/00 |
| 2020/0134439 A1* | 4/2020 | Turner ..................... | G06N 5/01 |
| 2020/0134696 A1* | 4/2020 | Lardeux ............. | G06Q 30/0254 |
| 2020/0242188 A1* | 7/2020 | Winger .................. | G06Q 50/06 |
| 2020/0293564 A1* | 9/2020 | Reh .......................... | G06N 3/08 |
| 2020/0302925 A1* | 9/2020 | Shah ....................... | G10L 15/22 |
| 2021/0233148 A1* | 7/2021 | Govindan .............. | G06N 20/00 |
| 2022/0147817 A1 | 5/2022 | Boardman et al. | |

OTHER PUBLICATIONS

Ma, Jiaqi, et al. "Off-policy learning in two-stage recommender systems." Proceedings of the Web Conference (2020), pp. 463-473 (Year: 2020).*

Talaat, Fatma M., et al. "Effective load balancing strategy (ELBS) for real-time fog computing environment using fuzzy and probabilistic neural networks." Journal of Network and Systems Management 27.4 (2019): 883-929 (Year: 2019).*

Dolatsara, Hamidreza Ahady, et al. "A two-stage machine learning framework to predict heart transplantation survival probabilities over time with a monotonic probability constraint." Decision Support Systems 137 (2020): 113363 (Year: 2020).*

Talaat, Fatma M., et al. "A load balancing and optimization strategy (LBOS) using reinforcement learning in fog computing environment." Journal of Ambient Intelligence and Humanized Computing 11.11 (2020): 4951-4966 (Year: 2020).*

Ando Sabas, Monotonicity Constraints in Machine Learning Journal: DataDive [online], 2018 [retrieved on: May 18, 2024], Retrieved from the Internet: <URL:https://blog.datadive.net/monotonicity-constraints-in-machine-learning/> (Year: 2018).

C. Miao, Cognitive Approach for Agent Based Personalized Recommendation Journal: Elsevier [online], 2007 [retrieved on Apr. 19, 2024]; Retrieved from the internet: <URL:https/www.sciencedirect.com/science/article/pii/S0950705106001699> (Year: 2007).

Lommatzsch, "Real time recommendations for user item streams Journal," Elsevier [online], 2015 [retrieved on Jun. 9, 2023], Retrieved from the Internet: <URL: https://dl.acm.org/doi/pdf/10.1145/2695664.2695678> (Year: 2015).

Non-Final Office Action issued in U.S. Appl. No. 17/207,563 on May 24, 2024.

Final Office Action issued in co-pending U.S. Appl. No. 17/207,563 on Dec. 12, 2023 (20 pages).

Ajay Shrestha, et al., "Review of Deep Learning Algorithms and Architectures," Journal: IEEE [online], Publication date: 2018, Retrieved from the Internet on Dec. 7, 2023 <URL: https://ieeexplore.ieee.org/abstract/document/8694781> (Year: 2018).

\* cited by examiner

300

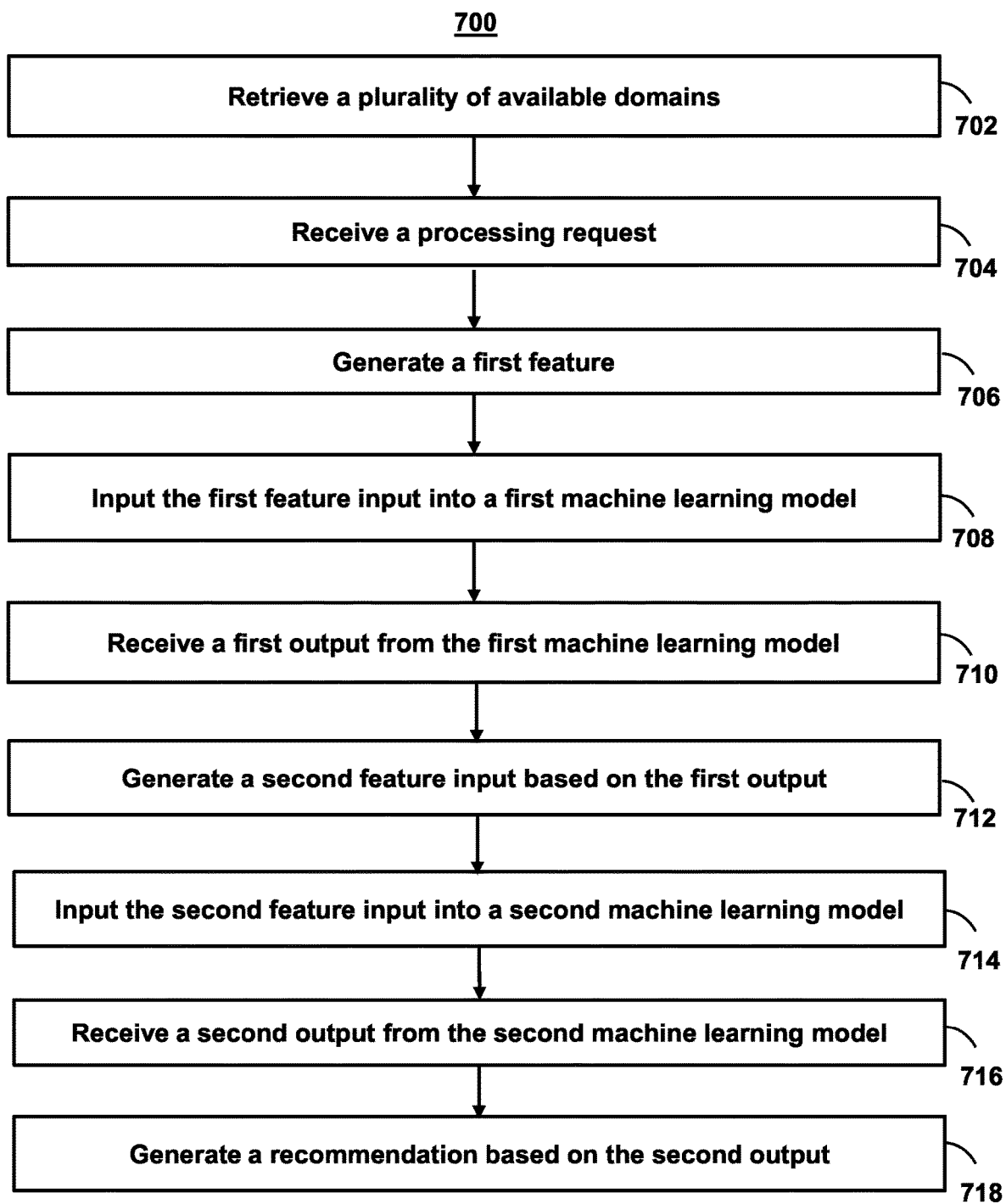

700

Retrieve a plurality of available domains — 702

Receive a processing request — 704

Generate a first feature — 706

Input the first feature input into a first machine learning model — 708

Receive a first output from the first machine learning model — 710

Generate a second feature input based on the first output — 712

Input the second feature input into a second machine learning model — 714

Receive a second output from the second machine learning model — 716

Generate a recommendation based on the second output — 718

FIG. 7

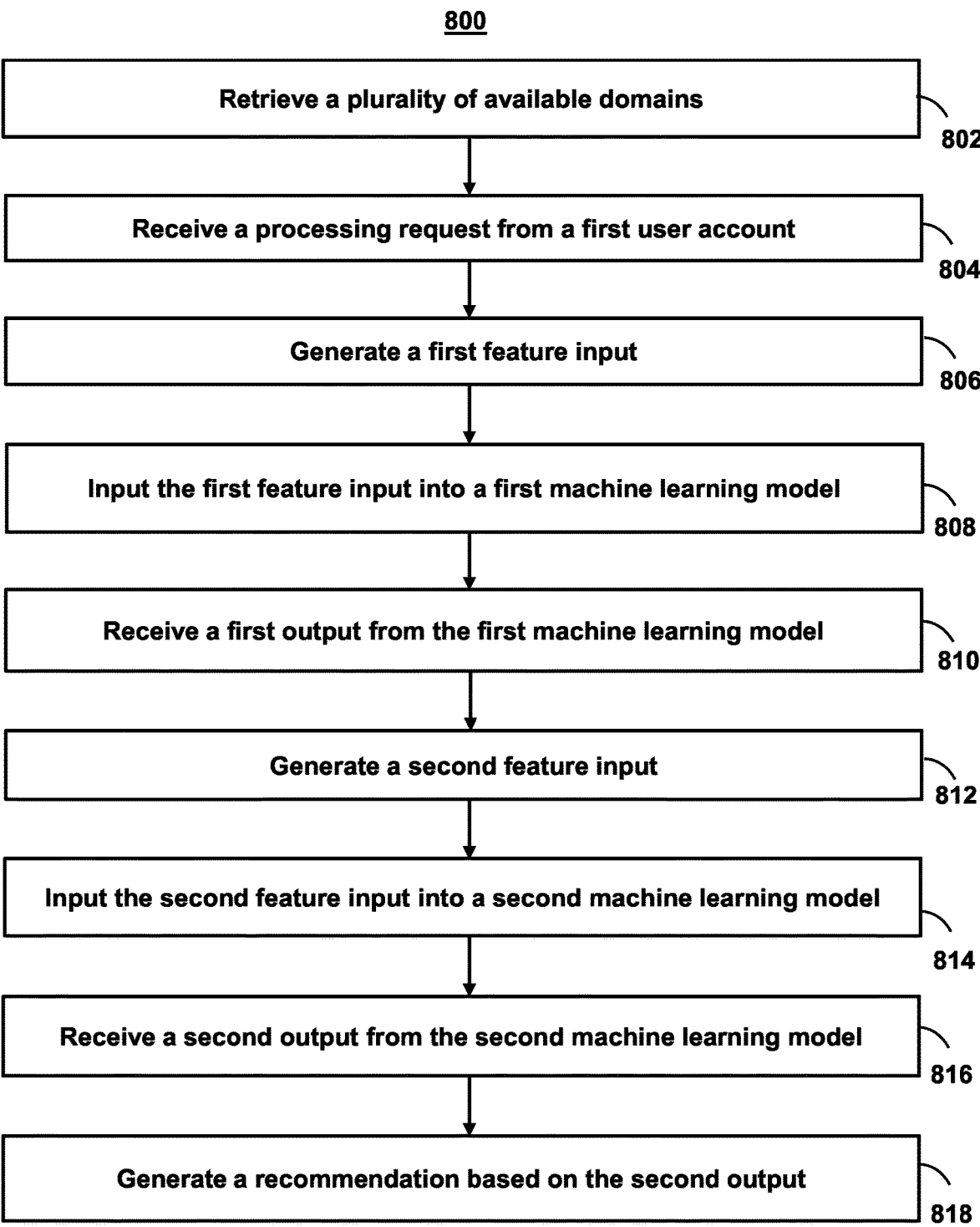

<u>800</u>

Retrieve a plurality of available domains — 802

Receive a processing request from a first user account — 804

Generate a first feature input — 806

Input the first feature input into a first machine learning model — 808

Receive a first output from the first machine learning model — 810

Generate a second feature input — 812

Input the second feature input into a second machine learning model — 814

Receive a second output from the second machine learning model — 816

Generate a recommendation based on the second output — 818

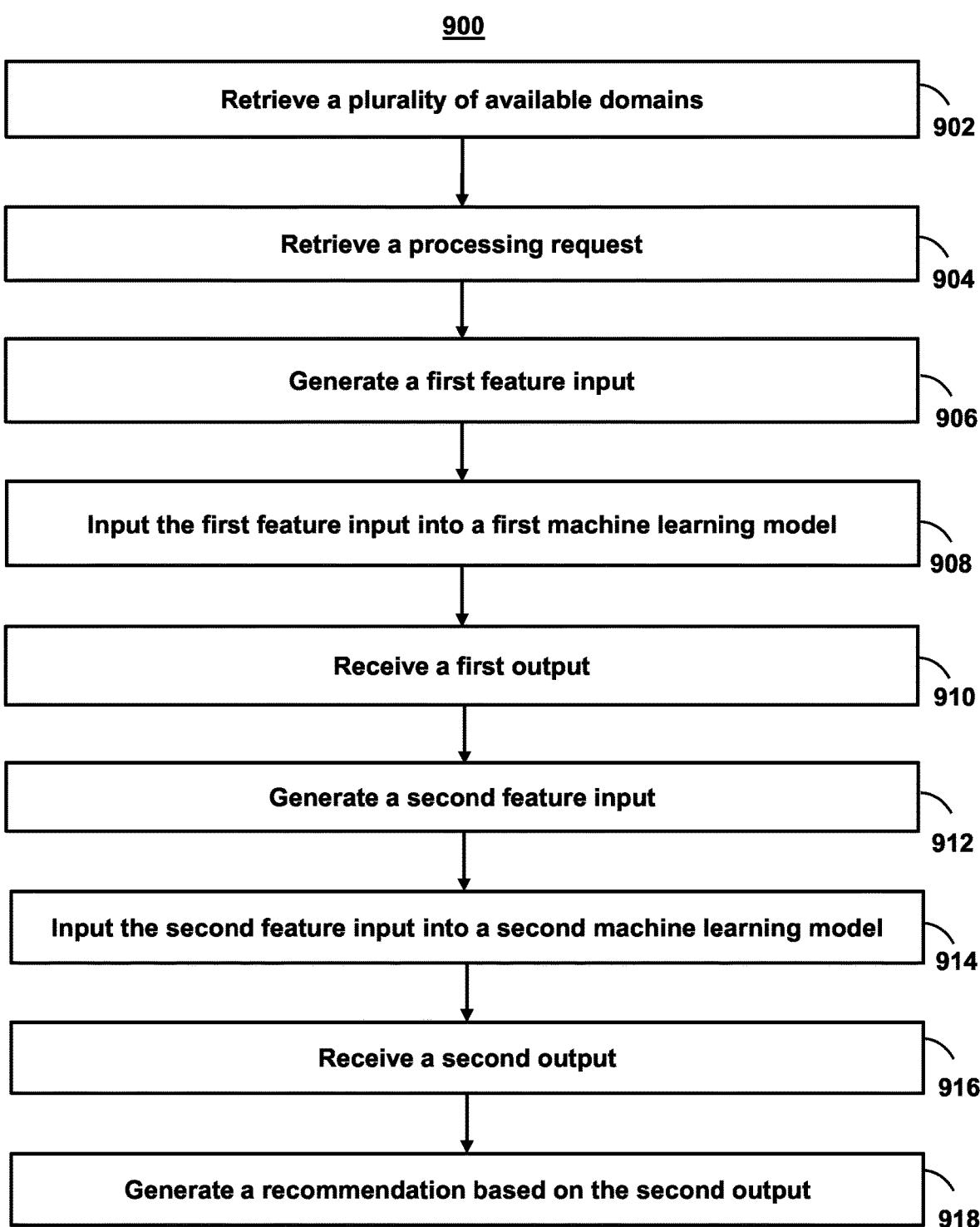

Retrieve a plurality of available domains    902

Retrieve a processing request    904

Generate a first feature input    906

Input the first feature input into a first machine learning model    908

Receive a first output    910

Generate a second feature input    912

Input the second feature input into a second machine learning model    914

Receive a second output    916

Generate a recommendation based on the second output    918

FIG. 9

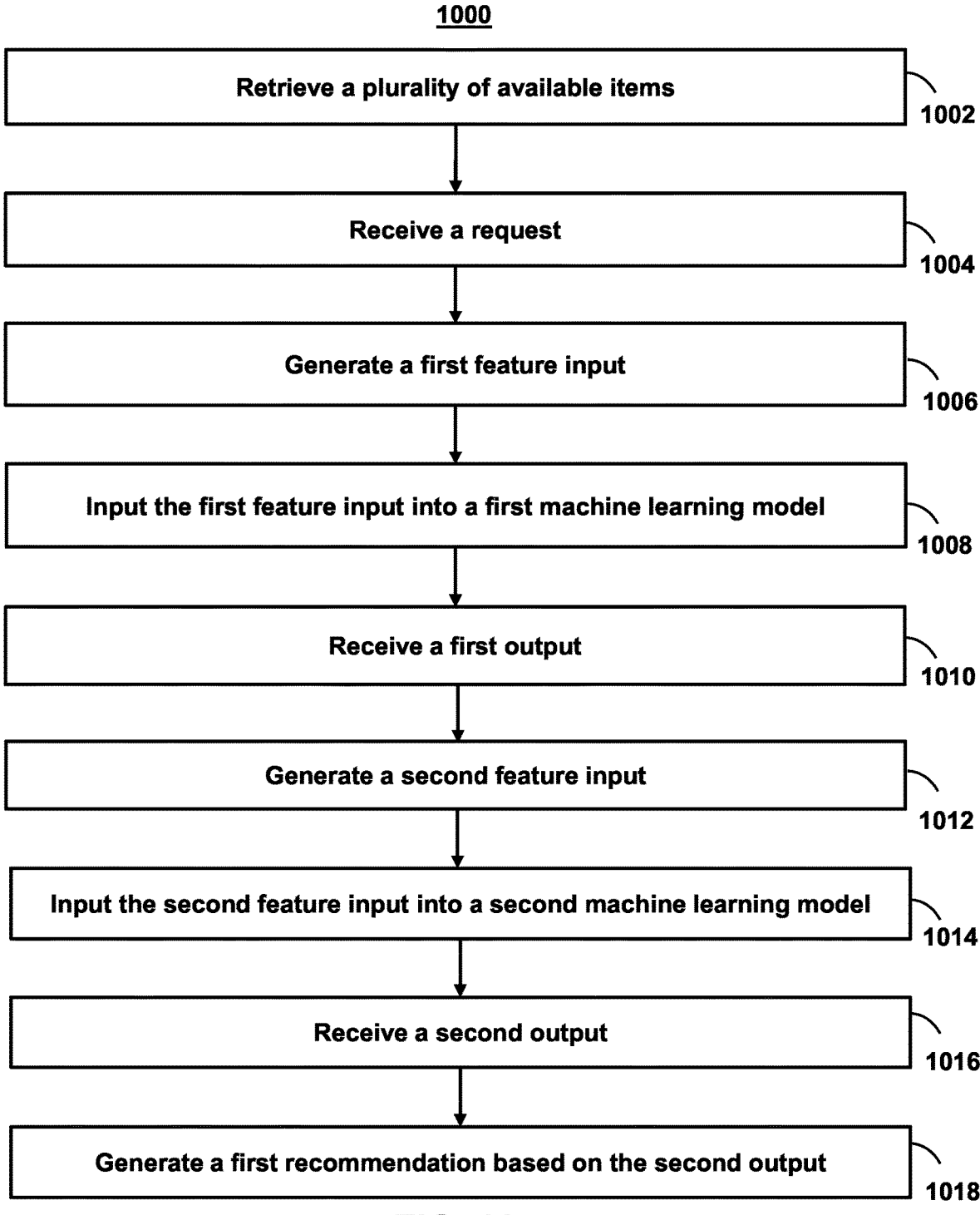

1000

Retrieve a plurality of available items  1002

Receive a request  1004

Generate a first feature input  1006

Input the first feature input into a first machine learning model  1008

Receive a first output  1010

Generate a second feature input  1012

Input the second feature input into a second machine learning model  1014

Receive a second output  1016

Generate a first recommendation based on the second output  1018

FIG. 10

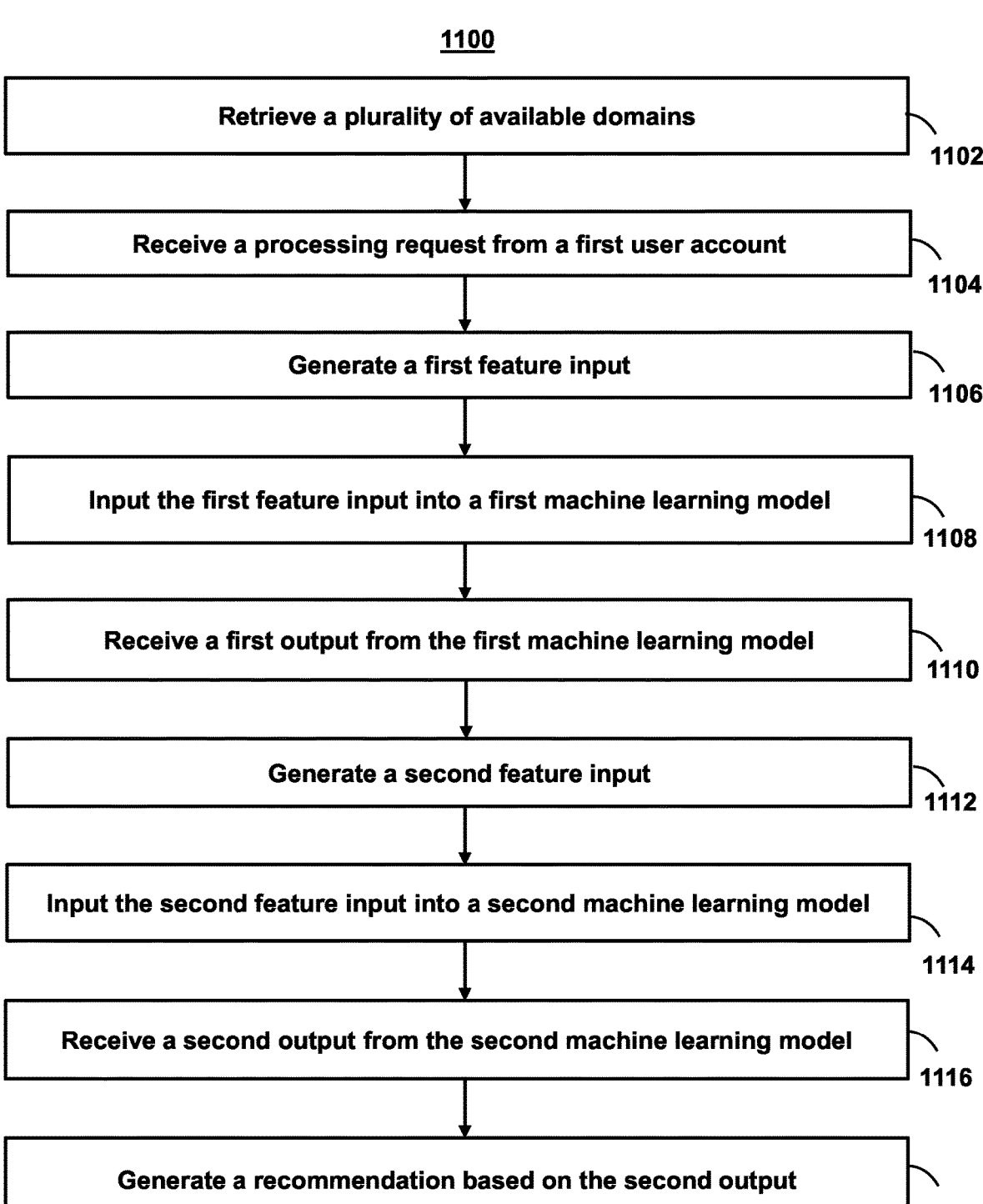

1100

Retrieve a plurality of available domains        1102

Receive a processing request from a first user account        1104

Generate a first feature input        1106

Input the first feature input into a first machine learning model        1108

Receive a first output from the first machine learning model        1110

Generate a second feature input        1112

Input the second feature input into a second machine learning model        1114

Receive a second output from the second machine learning model        1116

Generate a recommendation based on the second output        1118

FIG. 11

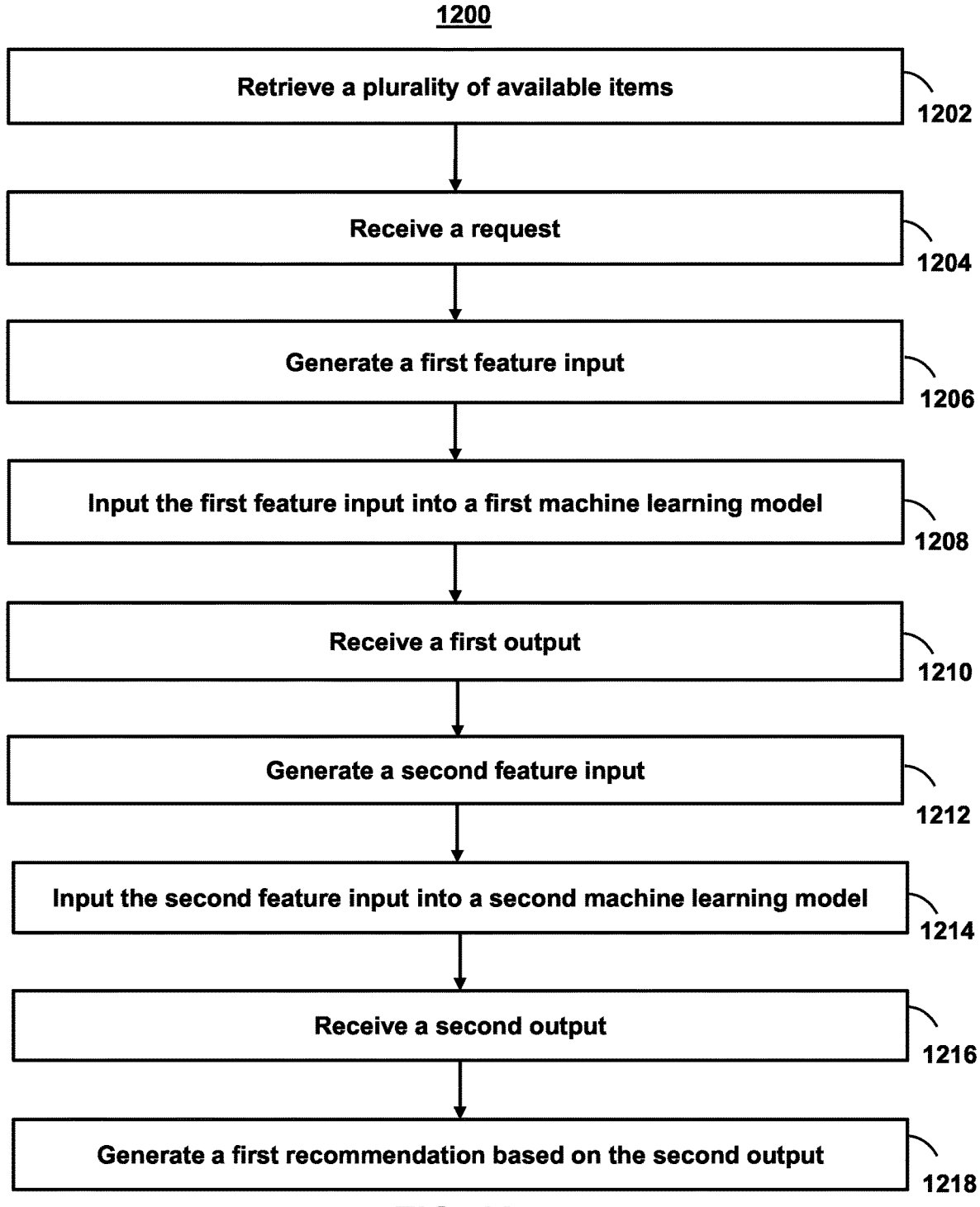

1200

Retrieve a plurality of available items
1202

Receive a request
1204

Generate a first feature input
1206

Input the first feature input into a first machine learning model
1208

Receive a first output
1210

Generate a second feature input
1212

Input the second feature input into a second machine learning model
1214

Receive a second output
1216

Generate a first recommendation based on the second output
1218

FIG. 12

METHODS AND SYSTEMS FOR DETERMINING RECOMMENDATIONS BASED ON REAL-TIME OPTIMIZATION OF MACHINE LEARNING MODELS

BACKGROUND

In recent years, the number of systems and applications that use data and the amounts of data that those systems and applications use has increased exponentially. In order to accommodate the growth in the amount of data that must be handled, many computer networks have moved towards a distributed model. For example, in a distributed network, the computer programming, software, and its data are spread out across more than one computer and are dependent upon each other. In many cases, one or more computers may be used to process data in parallel and/or perform tasks that benefit the system as a whole.

SUMMARY

Methods and systems are described herein for improvement for determining recommendations based on real-time optimization of machine learning models. Conventional recommendation mechanisms fail to compensate for the effects of rule sets or other constraints specific to a given item as well as how user characteristics specific to a request may affect a resulting item characteristic—factors not considered by conventional systems. For example, the interplay between these user characteristics and item specific rule sets may cause the same requests to result in different item characteristics based on the item selected.

In view of this problem, the methods and systems described herein use one or more machine learning models to generate recommendations for which item should be used to process a given request. For example, the system may provide a recommendation of a resulting item characteristic on a given item if a request is processed on that item. The system may also provide this recommendation simultaneously with other recommendations of resulting item characteristics on other items if the request is processed on the other items. Furthermore, the system may generate for display this recommendation in a user interface and allow a user to select a specific item. Using this functionality, the user may select a given item for the given request, improving the efficiency and overall network performance.

Moreover, in order to provide these recommendations, particularly to provide recommendations simultaneously with other recommendations, the methods and systems use specific machine learning architecture. These specific architectures provide for results being provided in real time by leveraging previously modeled data and applying that data to current scenarios. Additionally or alternatively, the specific architectures compensate for scenarios in which data is limited, or specific types of data is limited, by leveraging available, previously modeled data.

In one aspect, methods and systems for determining recommendations based on real-time optimization of machine learning models are described. For example, the system may retrieve a plurality of available items. The system may receive a request, wherein metadata for the request includes a user characteristic. The system may input the request into a machine learning model, wherein the machine learning model is trained to determine respective item characteristics for given requests for each of the plurality of available items, wherein each of the respective item characteristics is based on the plurality of user characteristics and respective item rule sets for each of the plurality of available items. The system may receive an output from the machine learning model. The system may generate for display, on a user interface, a recommendation for a first item characteristic for a first item of the plurality of available items based on the output.

In one aspect, methods and systems for determining recommendations based on real-time optimization of machine learning models are described. For example, the system may retrieve a plurality of available items. The system may receive a request, wherein metadata for the request includes a user characteristic. The system may generate a first feature input based on the metadata. The system may input the first feature input into a first machine learning model, wherein the first machine learning model is trained to determine additional user characteristics based on historical processing data and known user characteristics. The system may receive a first output from the first machine learning model, wherein the first output comprises the user characteristic and an additional user characteristic. The system may generate a second feature input based on the first output. The system may input the second feature input into a second machine learning model, wherein the second machine learning model is trained to determine respective item characteristics, for given requests, for each of the plurality of available items, wherein each of the respective item characteristics is based on the first output and respective item rule sets for each of the plurality of available items. The system may receive a second output from the second machine learning model. The system may generate for display, on a user interface, a first recommendation for a first item characteristic for a first item the plurality of available items based on the second output.

In one aspect, methods and systems for determining recommendations based on real-time optimization of machine learning models rule sets in are described. For example, the system may retrieve a plurality of available items. The system may receive a request from a first user account, wherein metadata for the request includes a plurality of user characteristics. The system may generate a first feature input based on the metadata. The system may input the first feature input into a first machine learning model, wherein the machine learning model is trained to determine respective item characteristic variables for each user characteristic of the plurality of user characteristics based on respective item rule sets for each of the plurality of available items. The system may receive a first output from the first machine learning model, wherein the first output comprises the respective variables for each user characteristic of the plurality of user characteristics. The system may generate a second feature input based on the first output. The system may input the second feature input into a second machine learning model, wherein the machine learning model is trained to aggregate the respective item characteristic variables for each user characteristic of the plurality of user characteristics to determine a respective aggregated item characteristic for each of the plurality of available items. The system may receive a second output from the second machine learning model, wherein the second output comprises the respective aggregated item characteristics for each of the plurality of available items. The system may generate for display, on a user interface, a recommendation of a first aggregated item characteristic for a first item of the plurality of available items based on the second output.

In one aspect, methods and systems for determining recommendations based on real-time optimization of machine learning models rule sets are described. For example, the system may retrieve a plurality of available items. The system may receive a request, wherein metadata for the request includes a user characteristic in a first user characteristic group. The system may generate a first feature input based on the metadata. The system may input the first feature input into a first machine learning model, wherein the first machine learning model is trained to determine additional characteristics based on imputing the additional characteristics using a group level k nearest neighbor algorithm, and wherein reference groups used for imputing the additional characteristics in the second user characteristic group are fixed across all ranks of the group level k nearest neighbor algorithm. The system may receive a first output from the first machine learning model, wherein the first output comprises the user characteristic and an additional user characteristic. The system may generate a second feature input based on the first output. The system may input the second feature input into a second machine learning model, wherein the second machine learning model is trained to determine respective item characteristics, for given requests, for each of the plurality of available items, wherein each of the respective item characteristics is based on the first output and respective item rule sets for each of the plurality of available items. The system may receive a second output from the second machine learning model. The system may generate for display, on a user interface, a first recommendation for a first item characteristic for a first item the plurality of available items based on the second output.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

BRIEF DESCRIPTION OF THE DRAWINGS

FIG. 7 shows a flowchart for generating real-time recommendations for balancing loads on domains with variable rule sets in distributed computer networks, in accordance with one or more embodiments.

FIG. 8 shows a flowchart for generating recommendations for balancing loads on domains with variable rule sets in distributed computer networks, in accordance with one or more embodiments.

FIG. 9 shows a flowchart for generating recommendations using a group level k nearest neighbor algorithm, in accordance with one or more embodiments.

FIG. 10 shows a flowchart for determining recommendations based on real-time optimization of machine learning models, in accordance with one or more embodiments.

FIG. 11 shows a flowchart for generating real-time recommendations, in accordance with one or more embodiments.

FIG. 12 shows a flowchart for generating real-time recommendations, in accordance with one or more embodiments.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form to avoid unnecessarily obscuring the embodiments of the invention.

Figure 1:
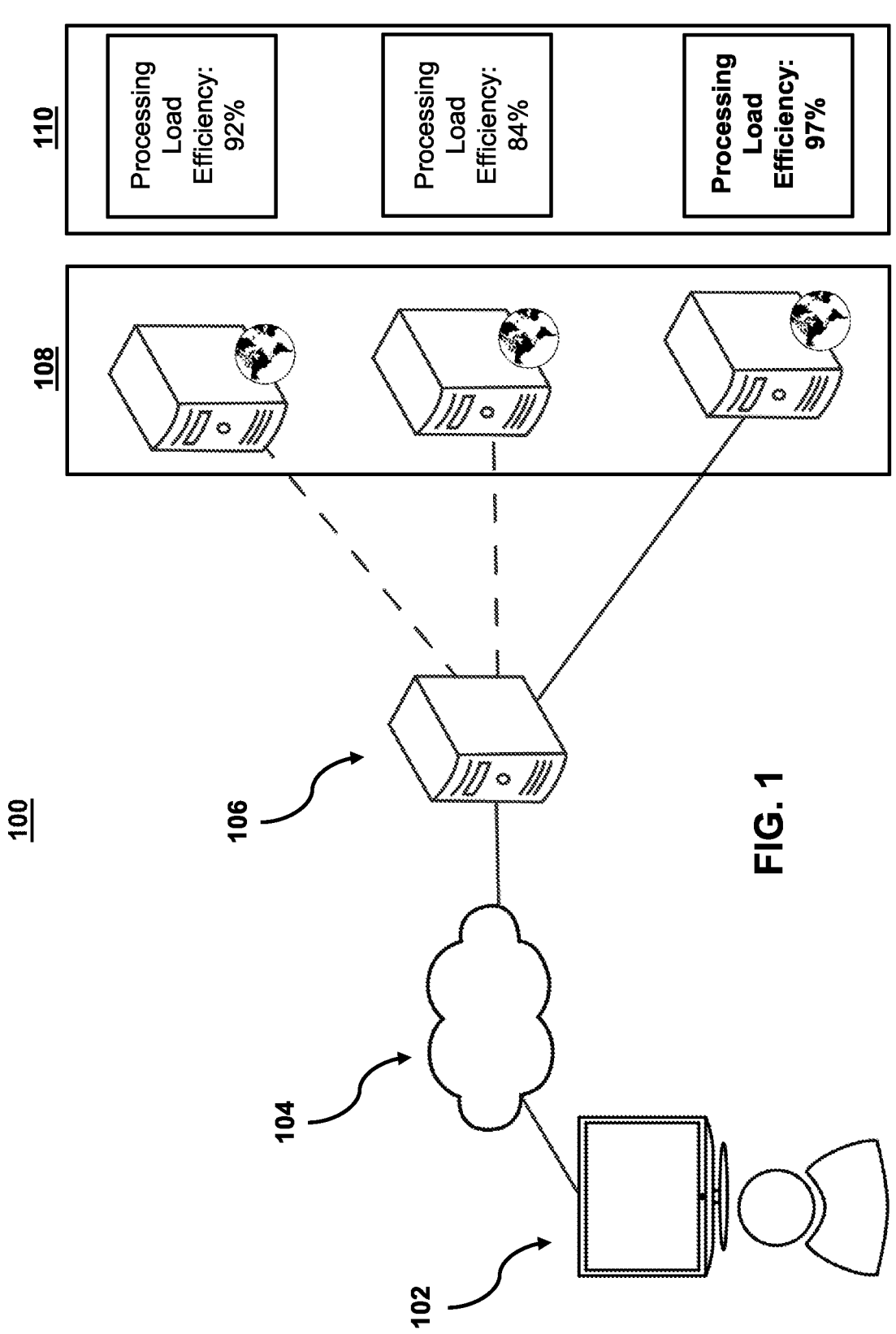
FIG. 1 shows an illustrative system diagram for balancing loads in distributed computer networks, in accordance with one or more embodiments.

FIG. 1 shows an illustrative system diagram for balancing loads in distributed computer networks, in accordance with one or more embodiments. For example, FIG. 1 includes system 100. System 100 includes user terminal 102, from which a user may enter processing requests and/or receiving recommendations. For example, using terminal 102, system 100 may receive a processing request to perform one or more tasks. System 100 may transmit the received processing request across communication network 104 (e.g., the Internet) to load balancer 106. Load balancer 106 may then select one or more servers (e.g., domains) of server cluster 108 for performing the task. For example, system 100 may display a respective recommendation (e.g., recommendation 110) for each potential domain in server cluster 108. Each respective recommendation may indicate a total processing load, and efficiency of the respective domain, etc.

In some embodiments, system 100 may poll information about each of the servers in server cluster 108 for domain specific rule sets and/or constraints. System 100 may additionally compare the domain specific rule sets and/or constraints to processing characteristics of the processing request. System 100 may then estimate a respective processing load that would result if each domain were selected to process the processing request. System 100 may then generate for display on user terminal 102 the respective processing loads. System 100 may then receive a user input via user terminal 102 indicating the particular server (e.g., domain) that the user wishes to use to process the processing request based on the respective processing loads. In some embodiments, system 100 may use one or more machine learning models as discussed below to determine the respective processing loads.

It should also be noted that system 100 and the embodiments described herein may be used for a plurality of applications in addition and/or related to load balancing. For example, the architecture and machine learning models may be applicable to numerous applications such as determining costs and/or pricing, allocating warehouse use and delivery schemes, etc.

Figure 2:
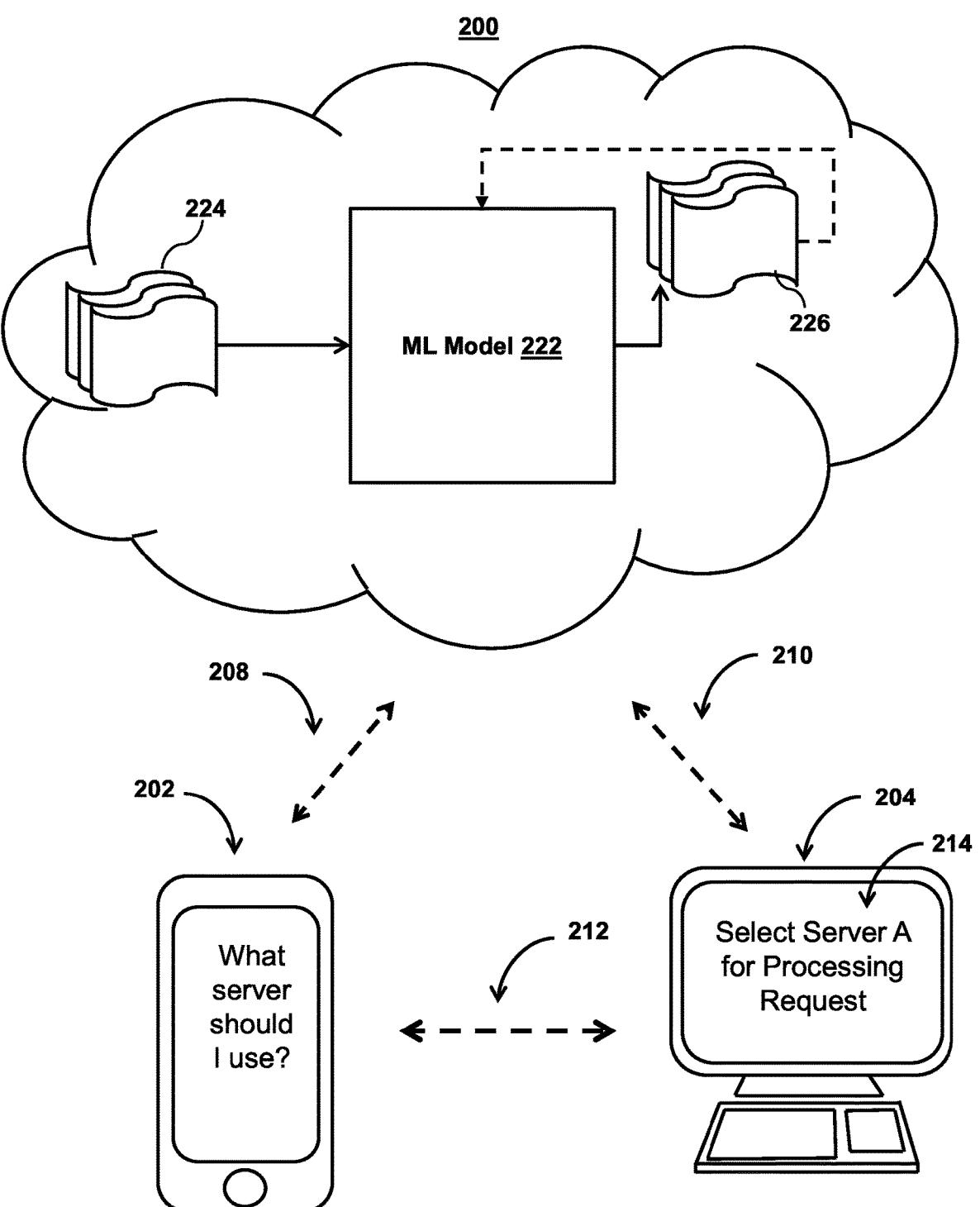
FIG. 2 shows a system featuring a machine learning model configured to balance loads in distributed computer networks, in accordance with one or more embodiments.

FIG. 2 shows a system featuring a machine learning model configured to balance loads in distributed computer networks, in accordance with one or more embodiments. As shown in FIG. 2, system 200 may include client device 202, client device 204 or other components. Each of client devices 202 and 204 may include any type of mobile terminal, fixed terminal, or other device. Each of these devices may receive content and data via input/output (hereinafter "I/O") paths and may also include processors and/or control circuitry to send and receive commands, requests, and other suitable data using the I/O paths. The control circuitry may comprise any suitable processing circuitry. Each of these devices may also include a user input interface and/or display for use in receiving and displaying data. By way of example, client devices 202 and 204 may include a desktop computer, a server, or other client device. Users may, for instance, utilize one or more client devices 202 and 204 to interact with one another, one or more servers, or other components of system 200. It should be noted that, while one or more operations are described herein as being performed by particular components of system 200, those operations may, in some embodiments, be performed by other components of system 200. As an example, while one or more operations are described herein as being performed by components of client device 202, those operations may, in some embodiments, be performed by components of client device 204. It should be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments).

Each of these devices may also include memory in the form of electronic storage. The electronic storage may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

FIG. 2 also includes communication paths 208, 210, and 212. Communication paths 208, 210, and 212 may include the Internet, a mobile phone network, a mobile voice or data network (e.g., a 5G or LTE network), a cable network, a public switched telephone network, or other types of communications networks or combinations of communications networks. Communication paths 208, 210, and 212 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

In some embodiments, system 200 may use one or more prediction models to generate recommendations. For example, as shown in FIG. 2, system 200 may generate a recommendation (e.g., as described in FIGS. 7-9 below) using machine learning model 222. The determination may be output shown as output 214 on client device 204. The system may include one or more neural networks (e.g., as discussed in relation to FIG. 3) or other machine learning models. System 200 may also provide a recommendation (e.g., term 306 (FIG. 3)) using machine learning model 222. The recommendation may be output shown as output 214 on client device 204.

As an example, with respect to FIG. 2, machine learning model 222 may take inputs 224 and provide outputs 226. The inputs may include multiple data sets such as a training data set and a test data set. In some embodiments, the training data set and test data set may be divided from a set of available and/or historical data. The split may be 60-80% training data and 20-40% testing data (e.g., for in-time validation). For example, the system may adjust the split based on numerous factors. For example, the test data set is used by the system to measure the performance in a real scenario on unseen data. Accordingly, the system may modify the split based on how much is needed for an accurate measurement, which further depends on the level of accuracy needed and the amount of variance expected. In some instances, if the total amount of training data is low, the system may reduce the increase the amount of training data in the split.

In one use case, outputs 226 may be fed back to machine learning model 222 as input to train machine learning model 222 (e.g., alone or in conjunction with user indications of the accuracy of outputs 226, labels associated with the inputs, or with other reference feedback information). In another use case, machine learning model 222 may update its configurations (e.g., weights, biases, or other parameters) based on its assessment of its prediction (e.g., outputs 226) and reference feedback information (e.g., user indication of accuracy, reference labels, or other information). In another use case, where machine learning model 222 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 222 may be trained to generate better predictions (e.g., recommendation 214).

Figure 3:
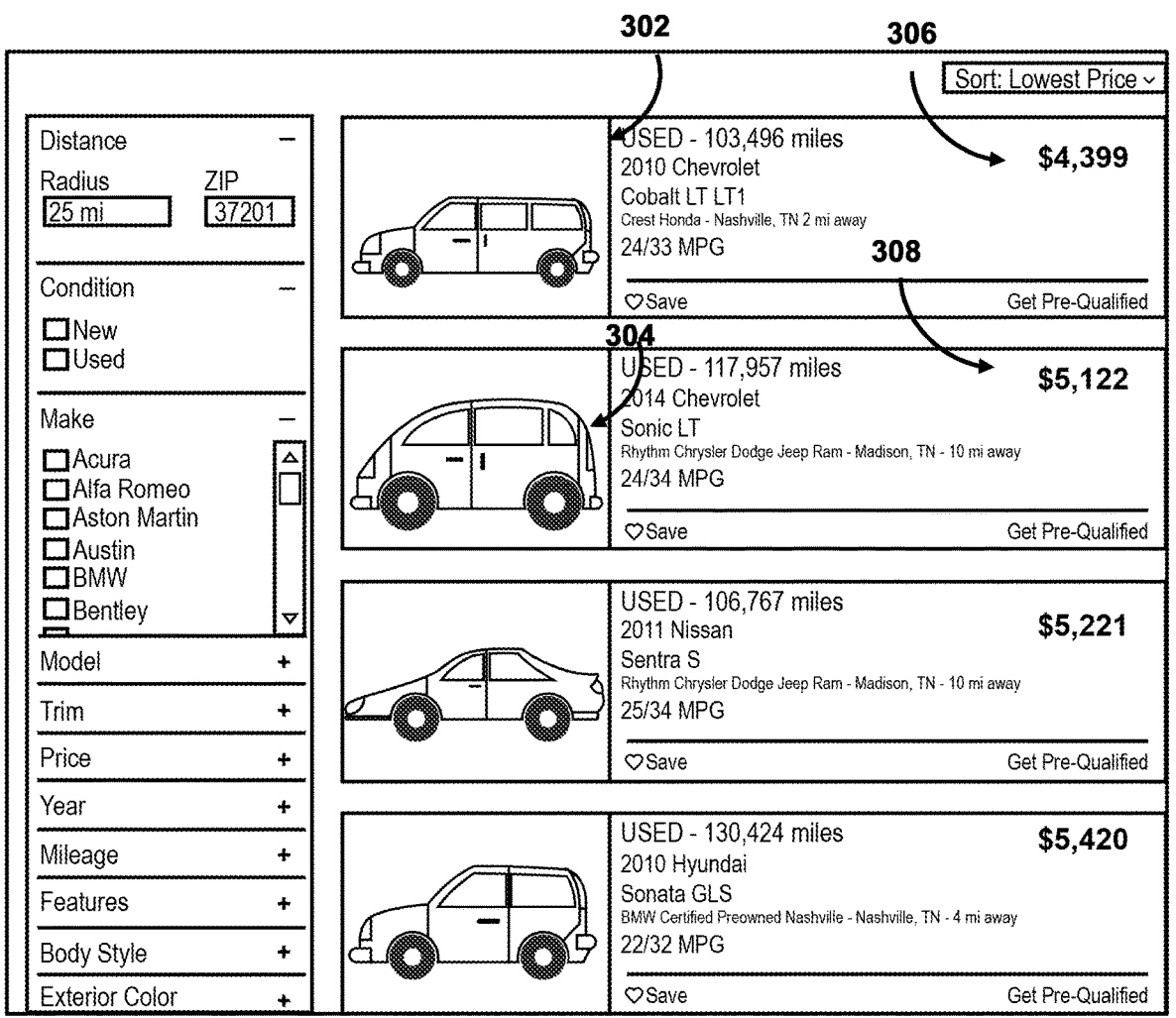
FIG. 3 shows an illustrative user interface for presenting recommendations based on balancing loads in distributed computer networks, in accordance with one or more embodiments.
Figure 4:
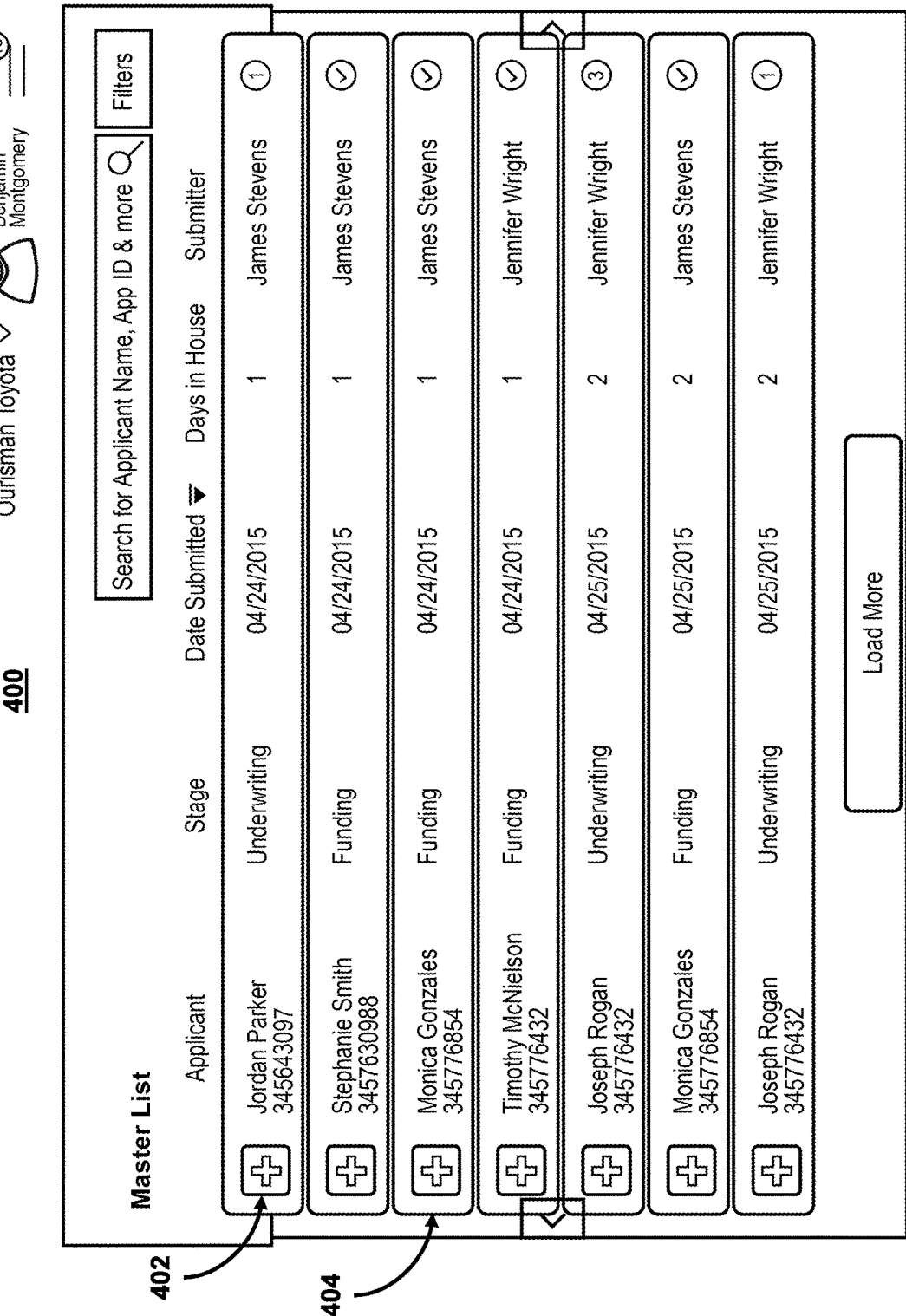
FIG. 4 shows another illustrative user interface for presenting recommendations based on balancing loads in distributed computer networks, in accordance with one or more embodiments.

FIGS. 3-4 may represent another application of the methods and systems described herein. For example, in some embodiments, the methods and systems described herein may be used to power online tools that provide real-time responses to user queries. For example, FIGS. 3-4 may represent respective user interfaces for two users (e.g., as shown on client devices 202 and 204 (FIG. 2)). For example, the system may be used to power an application that has two end-users for pricing. For example, as referred to herein methods and systems for generating recommendations for balancing loads on domains with variable rule sets in distributed computer networks may be applied to many applications outside of traditional load balancing. For example, as referred to herein, available domains may comprise any group of computers that can be accessed and administered with a common set of rules. Alternatively or additionally, the domain may comprise any object that is distinguishable from another object. For example, as described in FIGS. 3-4, a domain may comprise an available vehicle.

As another example, as referred to herein, a processing request may refer to a request to perform one or more computer functions and/or tasks. These tasks may comprise internal computer functions or application specific functions. For example, as described in FIGS. 3-4 a processing request may comprise a request for financial terms for an available vehicle. In such cases, the machine learning model may determine respective processing loads (e.g., financing terms for purchasing a vehicle) for given processing requests (e.g., for a given user request to see available vehicles and respective financing terms) for each of the plurality of available domains (e.g., vehicles available from one or more dealers). For example, in such a case the one or more dealers may comprise the distributed network as the dealers, dealerships, and/or vehicles are spread out across more than one area but communicate through the system and are dependent upon each other (e.g., terms offered and vehicles available from one dealer affect the terms offered by another).

As shown in FIGS. 3-4, the end users may be a vehicle buyer and a vehicle dealer. The dealer may communicate with a lender for dealer applications as shown in FIG. 4, while the buyer, who finances the vehicle may use the user interface shown in FIG. 3. In both cases, the end users may work with internal applications that generate real-time quotes or estimates for financing terms for a potential vehicle. In addition to providing real-time quotes or estimations of financing terms, the system may provide buyers with more granular pricing in areas where historically a large group of buyers or deals would receive the same price (i.e., prices may be set based on a demographic group and/or population segment). For example, in conventional systems, financing terms such as the amount of cash down amount would provide the same price for ranges as large as $5,000 when such pricing is based on a population segment. However, using the advancing machine learning models described herein, the system may provide and account-level pricing for the buyer with differences as small as $5. For example, prior to the application of the machine learning models described herein the ability to distinguish between user accounts based on information within those accounts was limited due to technical hurdles related to generating real-time recommendations, providing accurate results at a user account level, and a lack of complete data.

The methods and systems described herein overcome these technical hurdles to provide real-time recommendations, accurate results at a user account level, and compensate for any lack of data. Additionally, the buyer may receive multiple account level prices, for different vehicles and/or with different dealers, all within a single interface. For example, the system may provide different recommendations of vehicles for sale along with account level financing terms. These recommendations may be available to a user through drop down menus, filtering mechanism, etc. based on buyer inputs and the deal attributes.

For example, as described herein, the system uses novel machine learning techniques to provide recommendations in real-time. For example, in some instances, a buyer may enter a dealership without previously searching for financing terms. The system may need to generate recommendations in real time thus negating the ability to use modeling that is too time and/or processing intensive. However, the recommendations must still be accurate as the recommendations will need to be relied upon. In such instances, the system may determine how to use information previously determined by the system to assign financing terms (e.g., price, term, etc.) in real-time for future approvals. The system does this by structuring the model to assume that price sensitivity and valuations remain the same in the immediate future (e.g., a future financial term is similar to a period on which optimization was conducted). The system may then leverage a model to predict that optimal price using information available on the buyer, deal, and collateral. Accordingly, the system does not need to generate new models and/or process new data through the model, the system instead may identify processing characteristics of the processing request (e.g., the request from the buyer to access financing terms for available vehicles) and identify similar characteristics (e.g., additional characteristics as described in FIG. 7 below) and/or make assumptions based on the similarity of processing characteristics of the current processing request to historical data.

In some embodiments, in order to provide this, the system may use an individual data point and an XGBoost algorithm to real time predict what the solution of a linear programming optimization with certain constraint at portfolio level using the full set of portfolio data. The system may first pull a full set of historical portfolio data and run linear programming solver on it to get the optimal value for each data point. The system may then use a reversely built XGBoost model to predict the optimal value for each of the data points given certain predictors. The advantage of this is that the system may achieve real-time scoring of incoming data points without the need to collect a full set of portfolio data.

Additionally or alternatively, in some instances, the system may need to generate recommendations for a buyer, but the system may not have a complete data set for the buyer. That is, the system may need to impute some characteristics of the buyer in order to generate a recommendation and/or train a model to generate recommendations (e.g., as described in FIG. 8 below). For example, the system may use a k nearest neighbor (KNN) algorithm. A k nearest neighbor algorithm is a non-parametric supervised learning technique in which the system classifies a data point into a given category based on a training data set. For example, the system determines information of all training cases and classifies new cases based on a similarity. The methods and systems described herein may use an improved KNN architecture to impute data.

For example, the KNN imputation approach is especially useful when there is missing data in such a data structure as the whole population is made up of two layers of observations. The first layer of observations are IDs. Different ID means different identity, which can mean a different person, different applications, or different items. Then under each unique ID, the second layer of observations are different treatment scenarios. In the embodiments of FIGS. 3-4, this may mean different financing terms related to the same vehicle. If a certain processing characteristic is missing for all the treatment scenarios under some IDs, the system may use KNN imputation to impute these missing values by using the rest of IDs, which have value for this metric. Moreover, when the system performs the imputation, the system may maintain a sensitivity to the treatment, which is usually a monotonic trend between the imputation value and a treatment factor within those imputed ID. Through the use of the KNN imputation approach, the system ensures that missing values can be accurately imputed, but also preserve the treatment sensitivity in those imputed IDs. For example, if no sensitivity is maintained, minor differences in one or more processing characteristics may result in large jumps in the estimated processing loads (e.g., financing terms for a given vehicle).

For example, FIG. 3 shows an illustrative user interface for presenting recommendations based on balancing loads in distributed computer networks, in accordance with one or more embodiments. More specifically, FIG. 3 shows recommendations for a vehicle buying embodiment. For example, as shown in FIG. 3, user interface 300 comprises a user interface displaying a plurality of available vehicle listings (e.g., listings 302 and 304) with financing terms (e.g., terms 306 and 308) that are specific to a user. The system may use one or more machine learning models to generate user interface 300.

For example, the system may retrieve a plurality of available domains. In this embodiment, the plurality of available domains may comprise a plurality of available vehicles from one or more dealers. The system may also receive (e.g., via user terminal 102 (FIG. 1)) a processing request, wherein metadata for the processing request includes a processing characteristic. In this embodiment, the processing request may comprise a user request for a plurality of available vehicles (e.g., listings 302 and 304) and quotes for financial terms for buying the vehicles.

The system may input the processing request into a machine learning model, wherein the machine learning model is trained to determine respective processing loads for given processing requests for each of the plurality of available domains, wherein each of the respective processing loads is based on the plurality of processing characteristics and respective domain rule sets for each of the plurality of available domains. In this embodiment, the processing loads may comprise financing terms (e.g., terms 306 and 308) for each available vehicle. Additionally, the processing characteristics may comprise characteristics about the financial state and/or financial profile of the user (e.g., FICO score, creditworthiness, credit history, etc.). The respective domain rule sets may comprise information about the specific vehicle and/or dealer (e.g., risk score, Front-End Percentage, Term, and Vehicle Age). Accordingly, the system may use such factors as customer risk, deal structure, collateral, dealer relationship, etc. to determine the financial terms (e.g., terms 306 and 308) of a respective deal for each vehicle (e.g., listings 302 and 304).

The system may receive an output from the machine learning model. For example, the system may determine what financing terms would be acceptable and generate for display, on a user interface (e.g., user interface 300), a recommendation for a first processing load (e.g., term 306) for a first domain (e.g., listing 302) of the plurality of available domains based on the output.

FIG. 4 shows another illustrative user interface for presenting recommendations based on balancing loads in distributed computer networks, in accordance with one or more embodiments. For example, user interface 400 may show a user interface used by a dealer to track approval of financial terms extended to a buyer related to the purchase of a car.

For example, user interface 400 may include item 402 and item 404. Item 402 may relate to financing terms extended to one buyer for one car, in which the financing terms were determined by the system at an account level (i.e., the financing terms for a first buyer for the car may be different than the financing terms for a second buyer). Likewise, item 404 may relate to financing terms extended to a second buyer for a second car, in which the financing terms were determined by the system at an account level (i.e., the financing terms for the second buyer for the second car may be different than the financing terms for a third buyer for the second car).

Figure 5:
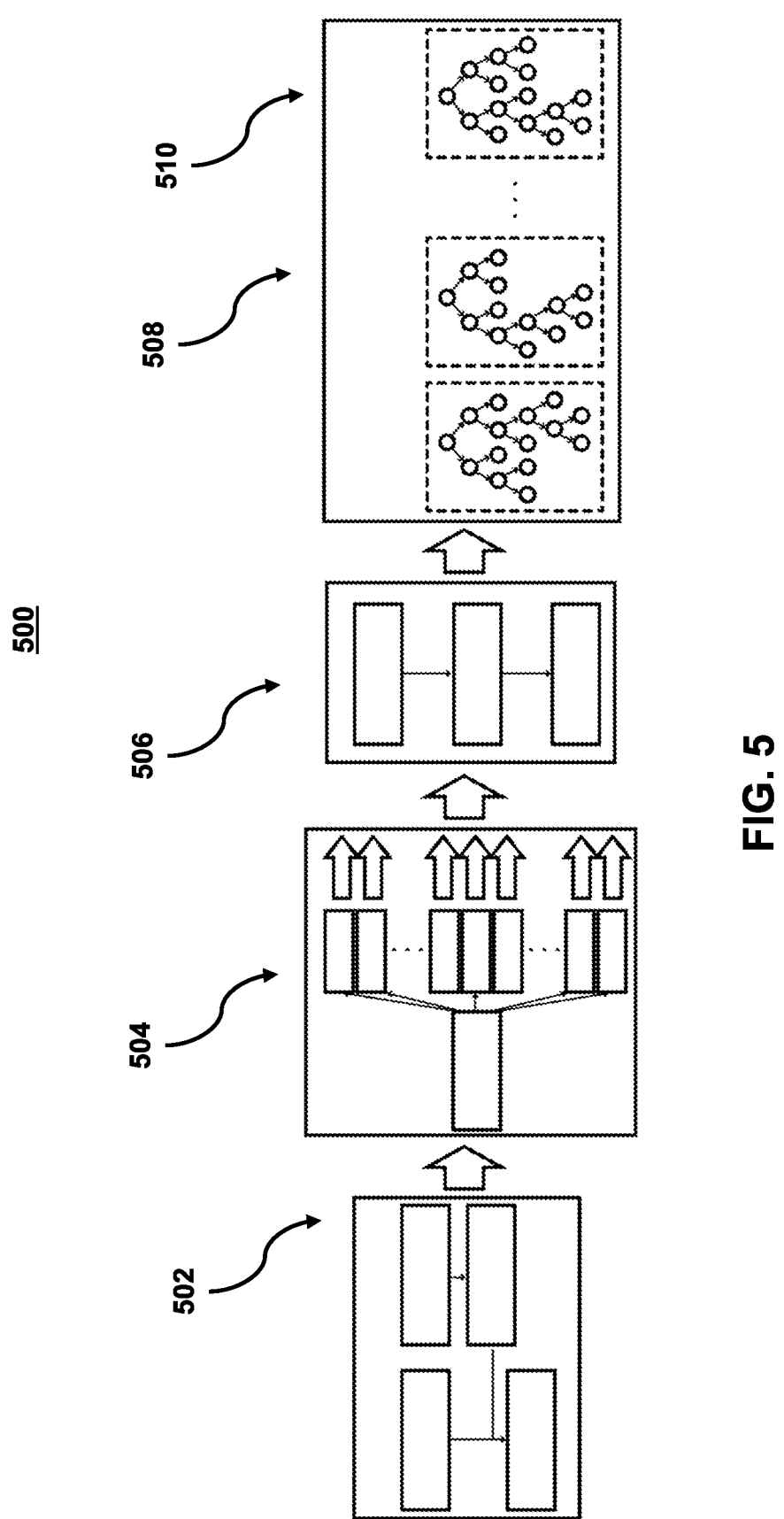
FIG. 5 shows an illustrative system architecture for balancing loads in distributed computer networks, in accordance with one or more embodiments.
Figure 6:
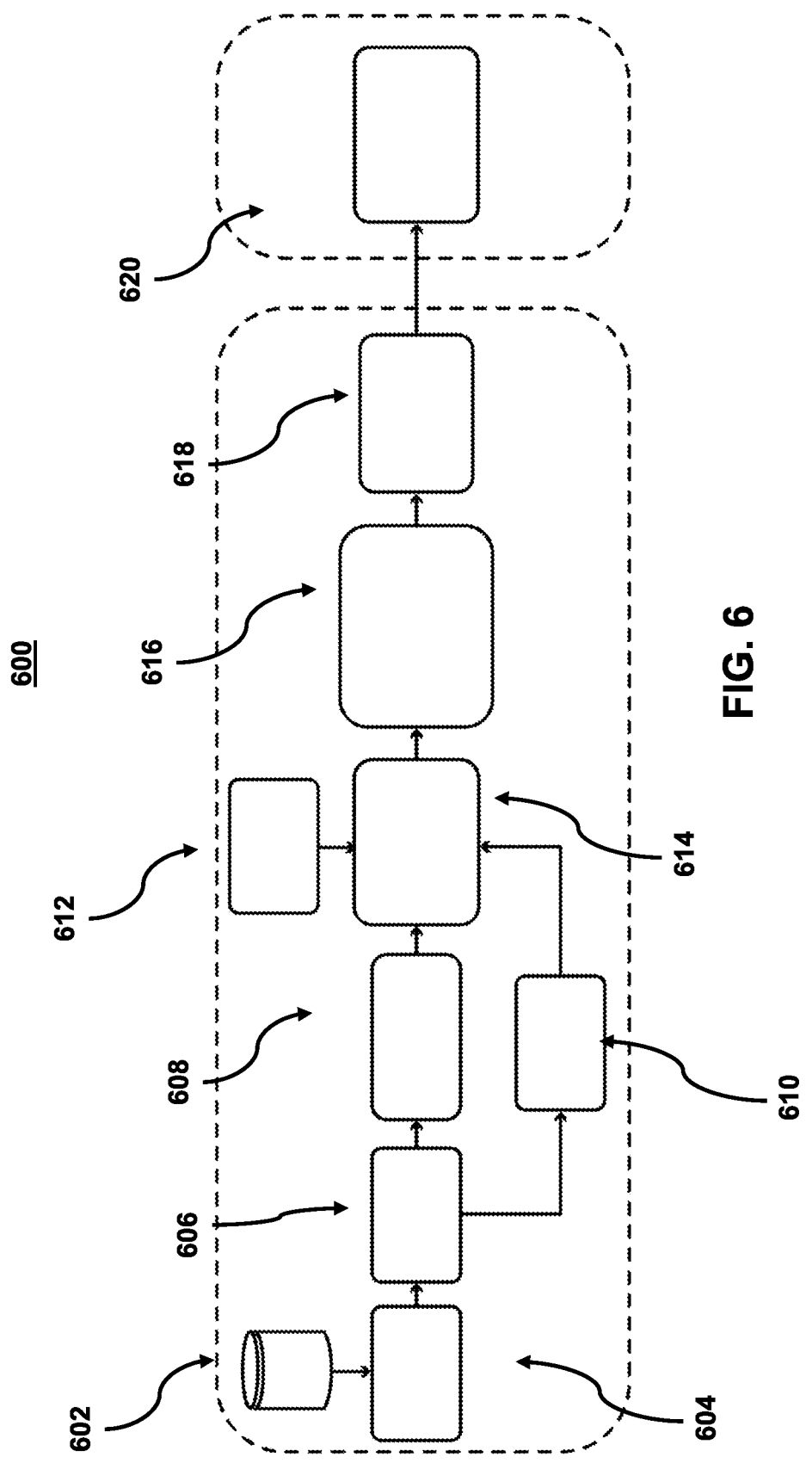
FIG. 6 shows another illustrative system architecture for balancing loads in distributed computer networks, in accordance with one or more embodiments.

FIGS. 5-6 describe balancing loads in distributed computer networks, in accordance with one or more embodiments. In some embodiments, such as those described in FIGS. 3-4, the system may power an application for pricing for auto loans. Typically, such financing terms (e.g., pricing) has been done at a segment level (e.g., a segment of the population), where accounts are grouped by five to seven segments into pre-defined groups that are assigned the same financing terms. This structure reduced the flexibility in which financing term dimensions could be added. For example, in order to adjust financing terms, the prior systems had to resort to adding univariate bumps after the segment financing terms were established. This bump framework leads to disjointed financing terms (e.g., price) optimizations with each financing term (e.g., price) bump having to be optimized independently of each other resulting in sub-optimal financing terms (e.g., price) recommendations. For example, prior to this solution, we were not able to provide optimal pricing at an account level. The methods and system described herein allow for the removal of this bumping framework and disjointed optimization by optimizing at the account level and using a gradient boosting machine to predict the optimal price chosen. This pricing model is then used as the object in production to provide financing terms (e.g., price).

For example, after determining optimal financing terms (e.g., price) in a build data set, the system assigns optimal financing terms to processing requests. For example, in some embodiments, the system may determine optimal financing terms defined as a pricing assignment regime which maximizes some total economic value (e.g. "NPV") while satisfying given constraints and guard rails (e.g. cashout constraint). The optimal financing terms may be computed by scoring real-time NPV and cashout probability (e.g., indicating the likelihood that loan terms will be met and/or payment will be made) and conducting the full process of calculating and maximizing NPV×cashout probability when a processing request (e.g., a loan application for a vehicle) is received. Furthermore, the systems overcome problems with conventional systems in that it is very difficult to apply constraints and guardrails in real time, as some models cannot be scored real time in production. To overcome this, the system leverages data from the recent past to conduct constrained optimization.

For example, financing terms (e.g., price) optimization is conducted on some recent period in the past and optimal financing terms are calculated for control approvals (accounts with no price treatment) in the optimization process. The system then uses this information to assign price in real-time for future approvals. The system does this by assuming that price sensitivity and valuations remain the same in the immediate future (i.e., similar to the period on which optimization was conducted), and then leverages a model to predict optimal financing terms using information available on the customer, deal, and collateral.

FIG. 5 shows an illustrative system architecture for balancing loads in distributed computer networks, in accordance with one or more embodiments. For example, the system may power a tool that generates optimal auto finance prices at an account level (e.g., specific to each buyer). The system's architecture may comprise of six stages as described in FIGS. 5-6 above such as data-pull/preparation, a cashout model building, account level valuations, account-level optimization, pricing model build, and portfolio level sizing. As opposed to conventional approaches, the system is able to use current market data and re-optimize price in only a few hours as opposed to a month as in conventional systems. The system also has flexibility that allows for adding new pricing dimensions with little overhead and/or backend engineering.

For example, FIG. 5 shows system 500. System 500 include model cashout phase 502, simulation and score phase 504, optimize phase 506, smart aggregation phase 508, and implementation phase 510.

For example, model cashout phase 502. For example, system 500 may use a two-stage logistic regression with forward variable selection. For example, forward selection is a type of stepwise regression which begins with an empty model and adds in variables one by one. In each forward step, system 500 may add the one variable that gives the single best improvement to the model.

For example, in simulation and score phase 504, system 500 simulates data and determines granular assessments. For example, system 500 may provide more granular simulations with one percent incremental steps from negative 20 to positive twenty percent.

For example, optimize phase 506 performs an optimization that is conducted at the most granular level (e.g., an account level optimization) while imposing portfolio-level constraints. For example, as opposed to fitting a model on top of the segment based table, which would have only simplified the process at a segment level instead of the account level. This would have failed to provide a method to deal with the previously mentioned bump structure. In contrast, the system uses the account level aggregation step to incorporate all of the pricing dimensions in the pricing model.

For example, smart aggregation phase 508 and implementation phase 510 uses a gradient boosting machine to aggregate using a model that identifies optimal cuts empirically. During this phase, granularity becomes a function of value and system 500 may assign incoming applications (e.g., processing requests) using a model object (e.g., model object 620 (FIG. 6)).

FIG. 6 shows another illustrative system architecture for balancing loads in distributed computer networks, in accordance with one or more embodiments. For example, system 600 represents a financing terms (e.g., price) optimization model that aggregates the results of the account-level optimization and assigns that step to a domain at model object 620.

System 600 begins with data 602. For example data 602 may comprise historical data related to financing terms, deals, and collateral organized in a temporal fashion. At object 604, system 600 performs a data pull. For example, system 600 may pull data related to a specific time period and/or user account. For example, due to the ever-changing market competition, system 600 may use the most current data to capture the price sensitivity of cashout rate and valuation. System 600 may build a pricing model on control data (approvals with no price treatment) that have had optimal financing terms chosen based on the simulated data in the optimization step (e.g., at object 616).

In some embodiments, system 600 may split data 602 into training and test sets with a split used of 70% for training and 30% for testing. In some embodiments, data preparation at object 606 may include hyper-parameter tuning, which is especially important for GBM models since they are prone to overfitting. The number of iterations (nrounds) may be determined by system 600 by Early Stopping technique. Early Stopping performs model optimization by monitoring the model's performance on the test data and stopping the training procedure once the performance on the test data stops improving beyond a certain number of iterations. The number of steps may be set to 50. Grid search is also performed to tune eta, max_depth, gamma, subsample, colsample_bytree, and min_child_weight. Apart from early stopping on the number of trees (nrounds), which is determined on every run, other hyperparameters of the model are not intended to be re-tuned on fitting of the model.

In system 600, the optimal financing terms may be a target for the financing terms model to predict. In some embodiments, system 600 may determine that the final buy-rate in production is subject to state rate floor and cap, and a global cap. System 600 may use the raw price as the pricing model target instead of using the global capped price for two reasons. First, capping price at a given amount is not very accurate since there will be other adjustments applied on top of the model prediction in production, such as back-end bumps and state scalars. Second, the resulting model tends to under-predict capped targets impacting the model's performance. Accordingly, when evaluating the model, system 600 reports both the uncapped version and capped version.

In system 600, all customer, deal, and collateral characteristics (e.g., processing characteristics) available in the production system at the time of assigning price (within fair-lending constraints), may be used as potential predictors.

As object 606, system 600 performs a data preparation phase. At this phase, the system may perform normalization and/or standardization of data. For example, system 600 may manipulate raw data into a form that can readily and accurately be analyzed (e.g., in order to generate recommendations). For example, system 600 may use a financing terms optimization model that uses the same input as a cashout model. In system 600, the input data transformations may be controlled by the same feature definition file, which dictates the imputation logic and capping/flooring limits. Additionally, system 600 may use variables that are capped at 99 percentile and floored at 1 percentile.

A difference from the cashout model is that there is a mixture of banded and raw predictor variables. For example, in system 600, three financial term dimensions are banded (approval amount, vehicle mileage, loan term) and the remaining variables are inputted as raw variables without any transformation. The system bands these values because tree based models (e.g., such as a gradient boosting machine (GBM)) are invariant to monotone transformations of any features. Accordingly, the reason for banding the three features is to improve dealer experience as system 600 aims to ensure that dealers do not experience too frequent/granular change of prices along certain dimensions.

At object 608, system 600 generates simulated data that along with inputs from model 612 and model 610 (e.g., a cashout model) are scored at object 614. System 600 then proceeds to object 616 to optimize individual account level financing terms before proceeding to financing term model 618. System 600 may use a GBM. The target of the model

618 is the financing term (e.g., price or base buy-rate) returned by the optimization. The inputs of the model are the customer, deal, and collateral characteristics (e.g., processing characteristics) available at the time of approval. Model 618 may be fitted using an xgBoost R package.

System 600 uses a GBM because it provides better predictive accuracy than classical techniques such as linear regression and random forests. Another advantage of tree based models such as GBM is that they require minimal data pre-processing. They are invariant to monotonic transformations of their inputs, and they inherently capture nonlinear and high order effects in the data.

The model is constrained to impose monotonic relationships between its predictions and four predictors: risk score, Front-End Percentage, Term, and Vehicle Age (e.g., respective domain rule sets). The rationale behind imposing monotonic relationship on key price dimensions is to enhance dealer experience. Thus, system 600 ensures that a dealer should not experience counter-intuitive price changes when the deal structure changes. The monotonicity constraints also serve as regularization to the model preventing the model from overfitting and picking up noise in the data. Empirical validations were conducted to ensure that the process maintains monotonic relationships in practice.

In some embodiments, the default loss function of XGBoost for continuous targets is root mean square error (RMSE), which minimizes the absolute difference between target price and predicted price. Instead of minimizing absolute difference, the relative difference is minimized for system 600. One way to minimize relative difference is to use a customized loss function which measures the relative loss that is implemented in the XGBoost R package. System 600 uses the mean square percentage error (MSPE) as the relative loss function. Another way to minimize relative difference is to log transform the target. A model using the log-transformed target and RMSE loss function is similar to one minimizing the log of prediction over target (ratio), another form of relative loss. In some embodiments, MSPE is chosen because it has the best out-of-time performance and delivers the best economic value.

In some embodiments, key model performance metrics include root mean square error (RMSE), mean absolute percentage error (MAPE), W10 (Proportion with Percent Error within 10%), W20 (Proportion with Percent Error within 20%), and W50 (Proportion with Percent Error within 50%) are reported.

FIG. 7 shows a flowchart for generating real-time recommendations for balancing loads on domains with variable rule sets in distributed computer networks, in accordance with one or more embodiments. For example, process 700 may represent the steps taken by one or more devices as shown in FIGS. 1-6 for generating recommendations.

At step 702, process 700 retrieves (e.g., using one or more components of system 200 (FIG. 2)) a plurality of available domains. For example, the system may retrieve a plurality of available domains in a distributed computer network. With respect to the embodiments of FIGS. 3-4, the plurality of domains may represent a plurality of vehicles available from one or more dealers.

At step 704, process 700 receives (e.g., using one or more components of system 200 (FIG. 2)) a processing request. For example, the system may receive a processing request, wherein metadata for the processing request includes a processing characteristic. In some embodiments, the system may comprise an identity of a user account corresponding to the processing request. For example, the processing characteristics may represent characteristics associated with a user account that initiated the processing request.

At step 706, process 700 generates (e.g., using one or more components of system 200 (FIG. 2)) a first feature. For example, the system may generate a first feature input based on the metadata. In some embodiments, the first feature input includes banded and raw values. For example, some values may be banded (e.g., fall within a range) as well as some raw values (e.g. unbanded values). In some embodiments, the system may further standardize values in a feature input in order to prevent bias from being introduced.

At step 708, process 700 inputs (e.g., using one or more components of system 200 (FIG. 2)) the first feature input into a first machine learning model. For example, the system may input the first feature input into a first machine learning model, wherein the first machine learning model is trained to determine additional processing characteristics based on historical processing data and known processing characteristics. In some embodiments, training the first machine learning model may comprise applying a linear program solver to the historical processing data to determine optimal data points for unknown processing characteristics based on the known processing characteristics and determining the additional processing characteristics based on historical processing data and known processing characteristics. For example, the system may generate a second feature input based on the first output.

At step 710, process 700 receives (e.g., using one or more components of system 200 (FIG. 2)) a first output from the first machine learning model. For example, the system may receive a first output from the first machine learning model, wherein the first output comprises the processing characteristic and an additional processing characteristic. For example, the first output may comprise optimal values for each point based on the historical data.

At step 712, process 700 generates (e.g., using one or more components of system 200 (FIG. 2)) a second feature input based on the first output. In some embodiments, the first feature input includes banded and raw values. For example, some values may be banded (e.g., fall within a range) as well as some raw values (e.g. unbanded values). In some embodiments, the system may further standardize values in a feature input in order to prevent bias from being introduced.

At step 714, process 700 inputs (e.g., using one or more components of system 200 (FIG. 2)) the second feature input into a second machine learning model. For example, the system may input the second feature input into a second machine learning model, wherein the second machine learning model is trained to determine respective processing loads, for given processing requests, for each of the plurality of available domains, wherein each of the respective processing loads is based on the first output and respective domain rule sets for each of the plurality of available domains. For example, the second machine learning model may comprise a gradient boosting machine, and the gradient boosting machine may comprise XGBoost gradient boosting framework. In some embodiments, the respective domain rule sets for each of the plurality of available domains comprises a respective performance level and age. Additionally or alternatively, the second machine learning model may be constrained to impose a monotonic relationship between the second output and the respective domain rule sets for each of the plurality of available domains.

For example, while a linear programming solver is a powerful algorithm, it cannot solve for a solution until the system has a full data set of the entire portfolio. Accordingly, this would require waiting for an amount of time to collect a portion of portfolio data and then run linear programming on that data. However, waiting a full cycle of time, which may comprise a month, in order to create a full data set means that prior solutions could not provide real-time results. In embodiments such as those discussed in FIGS. 3-4, the system may need to generate real-time recommendations without a full data set. Accordingly, the system may run this optimization process in real-time at an individual observation level, without knowing the relevant attributes of other observations in the same portfolio.

At step 716, process 700 receives (e.g., using one or more components of system 200 (FIG. 2)) a second output from the second machine learning model. For example, the system may receive a second output from the second machine learning model.

At step 718, process 700 generates (e.g., using one or more components of system 200 (FIG. 2)) a recommendation based on the second output. For example, the system may generate for display, on a user interface, a first recommendation for a first processing load for a first domain of the plurality of available domains based on the second output. In some embodiments, the system may receive a user selection of the first domain for the processing request and process the processing request using the first domain based on the user selection. Additionally or alternatively, the system may generate for display, on the user interface, a second recommendation for a second processing load for a second domain of the plurality of available domains based on the second output, wherein the second recommendation is displayed simultaneously with the first recommendation.

It is contemplated that the steps or descriptions of FIG. 7 may be used with any other embodiment of this disclosure. In addition, the steps and descriptions described in relation to FIG. 7 may be done in alternative orders, or in parallel to further the purposes of this disclosure. For example, each of these steps may be performed in any order, or in parallel, or substantially simultaneously to reduce lag or increase the speed of the system or method. Furthermore, it should be noted that any of the devices or equipment discussed in relation to FIGS. 1-6 could be used to perform one or more of the steps in FIG. 7.

FIG. 8 shows a flowchart for generating recommendations for balancing loads on domains with variable rule sets in distributed computer networks, in accordance with one or more embodiments. For example, process 800 may represent the steps taken by one or more devices as shown in FIGS. 1-6 for generating recommendations.

At step 802, process 800 retrieves (e.g., using one or more components of system 200 (FIG. 2)) a plurality of available domains. For example, the system may retrieve a plurality of available domains in a distributed computer network. With respect to the embodiments of FIGS. 3-4, the plurality of domains may represent a plurality of vehicles available from one or more dealers.

At step 804, process 800 receives (e.g., using one or more components of system 200 (FIG. 2)) a processing request from a first user account. For example, the system may receive a processing request from a first user account, wherein metadata for the processing request includes a plurality of processing characteristics. In some embodiments, the processing characteristic comprises an identity of a user account corresponding to the processing request. In some embodiments, the system may comprise an identity of a user account corresponding to the processing request. For example, the processing characteristics may represent characteristics associated with a user account that initiated the processing request.

At step 806, process 800 generates (e.g., using one or more components of system 200 (FIG. 2)) a first feature input. For example, the system may generate a first feature input based on the metadata. In some embodiments, the first feature input includes banded and raw values. For example, some values may be banded (e.g., fall within a range) as well as some raw values (e.g. unbanded values). In some embodiments, the system may further standardize values in a feature input in order to prevent bias from being introduced.

At step 808, process 800 inputs (e.g., using one or more components of system 200 (FIG. 2)) the first feature input into a first machine learning model. For example, the system may input the first feature input into a first machine learning model, wherein the machine learning model is trained to determine respective processing load variables for each processing characteristic of the plurality of processing characteristics based on respective domain rule sets for each of the plurality of available domains. In some embodiments, the respective domain rule sets for each of the plurality of available domains comprises a respective performance level and age. For example, the system may use a linear programming solver to determine optimal values for each point based on historical data.

For example, the system may power a tool that generates optimal auto finance prices at an account level (e.g., specific to each buyer). The system's architecture may be comprised of six stages as described in FIGS. 5-6 above such as data-pull/preparation, a cashout model building, account level valuations, account-level optimization, pricing model build, and portfolio level sizing.

At step 810, process 800 receives (e.g., using one or more components of system 200 (FIG. 2)) a first output from the first machine learning model. For example, the system may receive a first output from the first machine learning model, wherein the first output comprises the respective processing load variables for each processing characteristic of the plurality of processing characteristics.

At step 812, process 800 generates (e.g., using one or more components of system 200 (FIG. 2)) a second feature input. For example, the system may generate a second feature input based on the first output. In some embodiments, the first feature input includes banded and raw values. For example, some values may be banded (e.g., fall within a range) as well as some raw values (e.g. unbanded values). In some embodiments, the system may further standardize values in a feature input in order to prevent bias from being introduced.

At step 814, process 800 inputs (e.g., using one or more components of system 200 (FIG. 2)) the second feature input into a second machine learning model. For example, the system may input the second feature input into a second machine learning model, wherein the machine learning model is trained to aggregate the respective processing load variables for each processing characteristic of the plurality of processing characteristics to determine a respective aggregated processing load for each of the plurality of available domains. For example, the second machine learning model may comprise a gradient boosting machine, and the gradient boosting machine may comprise XGBoost gradient boosting framework. In some embodiments, the respective domain rule sets for each of the plurality of available domains comprises a respective performance level and age. Additionally or alternatively, the second machine learning model may be constrained to impose a monotonic relationship between the second output and the respective domain rule sets for each of the plurality of available domains.

At step 816, process 800 receives (e.g., using one or more components of system 200 (FIG. 2)) a second output from the second machine learning model. For example, the system may receive a second output from the second machine learning model, wherein the second output comprises the respective aggregated processing loads for each of the plurality of available domains.

At step 818, process 800 generates (e.g., using one or more components of system 200 (FIG. 2)) a recommendation based on the second output. For example, the system may generate for display, on a user interface, a recommendation of a first aggregated processing load for a first domain of the plurality of available domains based on the second output. In some embodiments, the system may receive a user selection of the first domain for the processing request and process the processing request using the first domain based on the user selection. Additionally or alternatively, the system may generate for display, on the user interface, a second recommendation for a second processing load for a second domain the plurality of available domains based on the second output, wherein the second recommendation is displayed simultaneously with the first recommendation. In some embodiments, the recommendation is provided in real-time upon receiving the processing request.

It is contemplated that the steps or descriptions of FIG. 8 may be used with any other embodiment of this disclosure. In addition, the steps and descriptions described in relation to FIG. 8 may be done in alternative orders, or in parallel to further the purposes of this disclosure. For example, each of these steps may be performed in any order, or in parallel, or substantially simultaneously to reduce lag or increase the speed of the system or method. Furthermore, it should be noted that any of the devices or equipment discussed in relation to FIGS. 1-6 could be used to perform one or more of the steps in FIG. 8.

FIG. 9 shows a flowchart for generating recommendations using a group level k nearest neighbor algorithm, in accordance with one or more embodiments. For example, process 900 may represent the steps taken by one or more devices as shown in FIGS. 1-6 for generating recommendations.

At step 902, process 900 retrieves (e.g., using one or more components of system 200 (FIG. 2)) a plurality of available domains. For example, the system may retrieve a plurality of available domains in a distributed computer network. With respect to the embodiments of FIGS. 3-4, the plurality of domains may represent a plurality of vehicles available from one or more dealers.

At step 904, process 900 retrieves (e.g., using one or more components of system 200 (FIG. 2)) a processing request. For example, the system may receive a processing request, wherein metadata for the processing request includes a processing characteristic in a first processing characteristic group. In some embodiments, the processing characteristic comprises an identity of a user account corresponding to the processing request. In some embodiments, the system may comprise an identity of a user account corresponding to the processing request. For example, the processing characteristics may represent characteristics associated with a user account that initiated the processing request.

For example, when there are several different potential treatments that the system may apply on different user accounts (e.g., corresponding to different buyers); however, the system may encounter situations where there are missing processing characteristics in one or more groups. The system may use a KNN imputation approach to complete the data without breaking certain sensitivity in the data against the treatment. For example, if no sensitivity is maintained, minor differences in one or more processing characteristics may result in large jumps in the estimated processing loads (e.g., financing terms for a given vehicle).

At step 906, process 900 generates (e.g., using one or more components of system 200 (FIG. 2)) a first feature input. For example, the system may generate a first feature input based on the metadata. In some embodiments, the first feature input includes banded and raw values.

At step 908, process 900 inputs (e.g., using one or more components of system 200 (FIG. 2)) the first feature input into a first machine learning model. For example, the system may input the first feature input into a first machine learning model, wherein the first machine learning model is trained to determine additional characteristics based on imputing the additional characteristics using a group level k nearest neighbor algorithm, and wherein reference groups used for imputing the additional characteristics in the second processing characteristic group are fixed across all ranks of the group level k nearest neighbor algorithm.

For example, as opposed to a traditional KNN use, the system may use the same group of reference neighbors across multiple approval levels and/or financing terms. By doing so, the system maintains sensitivity against the treatment and the system maintains a monotonic relationship (e.g., the value of one variable increases as the value of the other variable increases).

At step 910, process 900 receives (e.g., using one or more components of system 200 (FIG. 2)) a first output. For example, the system may receive a first output from the first machine learning model, wherein first output comprises the processing characteristic and an additional processing characteristic. For example, during the imputation process, the system may analyze reference observations at the same rank from other groups to impute the missing value at a specific rank in a group. The system also fixes the reference groups across all ranks for the same group of missing values. The advantage of doing this is that at any given rank number within a group of missing observations, the implementation approach of this system ensures that the KNN algorithm finds reference observations at the same rank number from the same several reference groups for this group of missing observations to do imputation. This ensures that the values in this group of missing observations will be ranked in an order (monotonic) after being imputed.

At step 912, process 900 generates (e.g., using one or more components of system 200 (FIG. 2)) a second feature input. For example, the system may generate a second feature input based on the first output. For example, in some embodiments, the second machine learning model may correspond to the machine learning models described herein for generating recommendations.

At step 914, process 900 inputs (e.g., using one or more components of system 200 (FIG. 2)) the second feature input into a second machine learning model. For example, the system may input the second feature input into a second machine learning model, wherein the second machine learning model is trained to determine respective processing loads, for given processing requests, for each of the plurality of available domains, wherein each of the respective processing loads is based on the first output and respective domain rule sets for each of the plurality of available domains. For example, the second machine learning model may comprise a gradient boosting machine, and the gradient boosting machine may comprise XGBoost gradient boosting framework. In some embodiments, the respective domain rule sets for each of the plurality of available domains comprises a respective performance level and age. Additionally or alternatively, the second machine learning model may be constrained to impose a monotonic relationship between the second output and the respective domain rule sets for each of the plurality of available domains.

At step 916, process 900 receives (e.g., using one or more components of system 200 (FIG. 2)) a second output. For example, the system may receive a second output from the second machine learning model.

At step 918, process 900 generates (e.g., using one or more components of system 200 (FIG. 2)) a recommendation based on the second output. For example, the system may generate for display, on a user interface, a first recommendation for a first processing load for a first domain the plurality of available domains based on the second output. In some embodiments, the system may receive a user selection of the first domain for the processing request and process the processing request using the first domain based on the user selection. Additionally or alternatively, the system may generate for display, on the user interface, a second recommendation for a second processing load for a second domain the plurality of available domains based on the second output, wherein the second recommendation is displayed simultaneously with the first recommendation. In some embodiments, the recommendation is provided in real time upon receiving the processing request.

It is contemplated that the steps or descriptions of FIG. 9 may be used with any other embodiment of this disclosure. In addition, the steps and descriptions described in relation to FIG. 9 may be done in alternative orders, or in parallel to further the purposes of this disclosure. For example, each of these steps may be performed in any order, or in parallel, or substantially simultaneously to reduce lag or increase the speed of the system or method. Furthermore, it should be noted that any of the devices or equipment discussed in relation to FIGS. 1-6 could be used to perform one or more of the steps in FIG. 9.

FIG. 10 shows a flowchart for determining recommendations based on real-time optimization of machine learning models, in accordance with one or more embodiments. For example, process 1000 may represent the steps taken by one or more devices as shown in FIGS. 1-6 for generating recommendations.

At step 1002, process 1000 retrieves (e.g., using one or more components of system 200 (FIG. 2)) a plurality of available items. For example, the system may retrieve a plurality of available items in a distributed computer network. With respect to the embodiments of FIGS. 3-4, the plurality of items may represent a plurality of vehicles available from one or more dealers.

At step 1004, process 1000 receives (e.g., using one or more components of system 200 (FIG. 2)) a request. For example, the system may receive a request, wherein metadata for the request includes a user characteristic. In some embodiments, the system may comprise an identity of a user account corresponding to the request. For example, the user characteristics may represent characteristics associated with a user account that initiated the request.

At step 1006, process 1000 generates (e.g., using one or more components of system 200 (FIG. 2)) a first feature. For example, the system may generate a first feature input based on the metadata. In some embodiments, the first feature input includes banded and raw values. For example, some values may be banded (e.g., fall within a range) as well as some raw values (e.g. unbanded values). In some embodiments, the system may further standardize values in a feature input in order to prevent bias from being introduced.

At step 1008, process 1000 inputs (e.g., using one or more components of system 200 (FIG. 2)) the first feature input into a first machine learning model. For example, the system may input the first feature input into a first machine learning model, wherein the first machine learning model is trained to determine additional user characteristics based on historical processing data and known user characteristics. In some embodiments, training the first machine learning model may comprise applying a linear program solver to the historical processing data to determine optimal data points for unknown user characteristics based on the known user characteristics and determining the additional user characteristics based on historical processing data and known user characteristics. For example, the system may generate a second feature input based on the first output.

At step 1010, process 1000 receives (e.g., using one or more components of system 200 (FIG. 2)) a first output from the first machine learning model. For example, the system may receive a first output from the first machine learning model, wherein the first output comprises the user characteristic and an additional user characteristic. For example, the first output may comprise optimal values for each point based on the historical data.

At step 1012, process 1000 generates (e.g., using one or more components of system 200 (FIG. 2)) a second feature input based on the first output. In some embodiments, the first feature input includes banded and raw values. For example, some values may be banded (e.g., fall within a range) as well as some raw values (e.g., unbanded values). In some embodiments, the system may further standardize values in a feature input in order to prevent bias from being introduced.

At step 1014, process 1000 inputs (e.g., using one or more components of system 200 (FIG. 2)) the second feature input into a second machine learning model. For example, the system may input the second feature input into a second machine learning model, wherein the second machine learning model is trained to determine respective item characteristics, for a given request, for each of the plurality of available items, wherein each of the respective item characteristics is based on the first output and respective item rule sets for each of the plurality of available items. For example, the second machine learning model may comprise a gradient boosting machine, and the gradient boosting machine may comprise XGBoost gradient boosting framework. In some embodiments, the respective item rule sets for each of the plurality of available items comprises a respective performance level and age. Additionally or alternatively, the second machine learning model may be constrained to impose a monotonic relationship between the second output and the respective item rule sets for each of the plurality of available items.

For example, while a linear programming solver is a powerful algorithm, it cannot solve for a solution until the system has a full data set of the entire portfolio. Accordingly, this would require waiting for an amount of time to collect a portion of portfolio data and then run linear programming on that data. However, waiting a full cycle of time, which may comprise a month, in order to create a full data set means that the prior solution could not provide real-time results. In embodiments such as those discussed in FIGS. 3-4, the system may need to generate real-time recommendations without a full data set. Accordingly, the system may run this optimization process in real time at an individual observation level, without knowing the relevant attributes of other observations in the same portfolio.

At step 1016, process 1000 receives (e.g., using one or more components of system 200 (FIG. 2)) a second output from the second machine learning model. For example, the system may receive a second output from the second machine learning model.

At step 1018, process 1000 generates (e.g., using one or more components of system 200 (FIG. 2)) a recommendation based on the second output. For example, the system may generate for display, on a user interface, a first recommendation for a first item characteristic for a first item of the plurality of available items based on the second output. In some embodiments, the system may receive a user selection of the first item for the request and process the request using the first item based on the user selection. Additionally or alternatively, the system may generate for display, on the user interface, a second recommendation for a second item characteristic for a second item of the plurality of available items based on the second output, wherein the second recommendation is displayed simultaneously with the first recommendation.

It is contemplated that the steps or descriptions of FIG. 10 may be used with any other embodiment of this disclosure. In addition, the steps and descriptions described in relation to FIG. 10 may be done in alternative orders, or in parallel to further the purposes of this disclosure. For example, each of these steps may be performed in any order, or in parallel, or substantially simultaneously to reduce lag or increase the speed of the system or method. Furthermore, it should be noted that any of the devices or equipment discussed in relation to FIGS. 1-6 could be used to perform one or more of the steps in FIG. 10.

FIG. 11 shows a flowchart for generating real-time recommendations, in accordance with one or more embodiments. For example, process 1100 may represent the steps taken by one or more devices as shown in FIGS. 1-6 for generating recommendations.

At step 1102, process 1100 retrieves (e.g., using one or more components of system 200 (FIG. 2)) a plurality of available items. For example, the system may retrieve a plurality of available items in a distributed computer network. With respect to the embodiments of FIGS. 3-4, the plurality of items may represent a plurality of vehicles available from one or more dealers.

At step 1104, process 1100 receives (e.g., using one or more components of system 200 (FIG. 2)) a request from a first user account. For example, the system may receive a request from a first user account, wherein metadata for the request includes a plurality of user characteristics. In some embodiments, the user characteristic comprises an identity of a user account corresponding to the request. In some embodiments, the system may comprise an identity of a user account corresponding to the request. For example, the user characteristics may represent characteristics associated with a user account that initiated the request.

At step 1106, process 1100 generates (e.g., using one or more components of system 200 (FIG. 2)) a first feature input. For example, the system may generate a first feature input based on the metadata. In some embodiments, the first feature input includes banded and raw values. For example, some values may be banded (e.g., fall within a range) as well as some raw values (e.g. unbanded values). In some embodiments, the system may further standardize values in a feature input in order to prevent bias from being introduced.

At step 1108, process 1100 inputs (e.g., using one or more components of system 200 (FIG. 2)) the first feature input into a first machine learning model. For example, the system may input the first feature input into a first machine learning model, wherein the machine learning model is trained to determine respective item characteristic variables for each user characteristic of the plurality of user characteristics based on respective item rule sets for each of the plurality of available items. In some embodiments, the respective item rule sets for each of the plurality of available items comprises a respective performance level and age. For example, the system may use a linear programming solver to determine optimal values for each point based on historical data.

For example, the system may power a tool that generates optimal auto finance prices at an account level (e.g., specific to each buyer). The system's architecture may comprise of six stages as described in FIGS. 5-6 above such as data-pull/preparation, a cashout model building, account level valuations, account-level optimization, pricing model build, and portfolio level sizing.

At step 1110, process 1100 receives (e.g., using one or more components of system 200 (FIG. 2)) a first output from the first machine learning model. For example, the system may receive a first output from the first machine learning model, wherein first output comprises the respective item characteristic variables for each user characteristic of the plurality of user characteristics.

At step 1112, process 1100 generates (e.g., using one or more components of system 200 (FIG. 2)) a second feature input. For example, the system may generate a second feature input based on the first output. In some embodiments, the first feature input includes banded and raw values. For example, some values may be banded (e.g., fall within a range) as well as some raw values (e.g., unbanded values). In some embodiments, the system may further standardize values in a feature input in order to prevent bias from being introduced.

At step 1114, process 1100 inputs (e.g., using one or more components of system 200 (FIG. 2)) the second feature input into a second machine learning model. For example, the system may input the second feature input into a second machine learning model, wherein the machine learning model is trained to aggregate the respective item characteristic variables for each user characteristic of the plurality of user characteristics to determine a respective aggregated item characteristic for each of the plurality of available items. For example, the second machine learning model may comprise a gradient boosting machine, and the gradient boosting machine may comprise XGBoost gradient boosting framework. In some embodiments, the respective item rule sets for each of the plurality of available items comprises a respective performance level and age. Additionally or alternatively, the second machine learning model may be constrained to impose a monotonic relationship between the second output and the respective item rule sets for each of the plurality of available items.

At step 1116, process 1100 receives (e.g., using one or more components of system 200 (FIG. 2)) a second output from the second machine learning model. For example, the system may receive a second output from the second machine learning model, wherein the second output comprises the respective aggregated item characteristics for each of the plurality of available items.

At step 1118, process 1100 generates (e.g., using one or more components of system 200 (FIG. 2)) a recommendation based on the second output. For example, the system may generate for display, on a user interface, a recommendation of a first aggregated item characteristic for a first item of the plurality of available items based on the second output. In some embodiments, the system may receive a user selection of the first item for the request and process the request using the first item based on the user selection. Additionally or alternatively, the system may generate for display, on the user interface, a second recommendation for a second item characteristic for a second item of the plurality of available items based on the second output, wherein the second recommendation is displayed simultaneously with the first recommendation. In some embodiments, the recommendation is provided in real time upon receiving the request.

It is contemplated that the steps or descriptions of FIG. 11 may be used with any other embodiment of this disclosure. In addition, the steps and descriptions described in relation to FIG. 11 may be done in alternative orders, or in parallel to further the purposes of this disclosure. For example, each of these steps may be performed in any order, or in parallel, or substantially simultaneously to reduce lag or increase the speed of the system or method. Furthermore, it should be noted that any of the devices or equipment discussed in relation to FIGS. 1-6 could be used to perform one or more of the steps in FIG. 11.

FIG. 12 shows a flowchart for generating real-time recommendations, in accordance with one or more embodiments. For example, process 1200 may represent the steps taken by one or more devices as shown in FIGS. 1-6 for generating recommendations.

At step 1202, process 1200 retrieves (e.g., using one or more components of system 200 (FIG. 2)) a plurality of available items. For example, the system may retrieve a plurality of available items in a distributed computer network. With respect to the embodiments of FIGS. 3-4, the plurality of items may represent a plurality of vehicles available from one or more dealers.

At step 1204, process 1200 receives (e.g., using one or more components of system 200 (FIG. 2)) a request. For example, the system may receive a request, wherein metadata for the request includes a user characteristic. In some embodiments, the system may comprise an identity of a user account corresponding to the request. For example, the user characteristics may represent characteristics associated with a user account that initiated the request.

At step 1206, process 1200 generates (e.g., using one or more components of system 200 (FIG. 2)) a first feature. For example, the system may generate a first feature input based on the metadata. In some embodiments, the first feature input includes banded and raw values. For example, some values may be banded (e.g., fall within a range) as well as some raw values (e.g., unbanded values). In some embodiments, the system may further standardize values in a feature input in order to prevent bias from being introduced.

At step 1208, process 1200 inputs (e.g., using one or more components of system 200 (FIG. 2)) the first feature input into a first machine learning model. For example, the system may input the first feature input into a first machine learning model, wherein the first machine learning model is trained to determine additional characteristics based on imputing the additional characteristics using a group level k nearest neighbor algorithm, and wherein reference groups used for imputing the additional characteristics in the second user characteristic group are fixed across all ranks of the group level k nearest neighbor algorithm. In some embodiments, training the first machine learning model may comprise applying a linear program solver to the historical processing data to determine optimal data points for unknown user characteristics based on the known user characteristics and determining the additional user characteristics based on historical processing data and known user characteristics. For example, the system may generate a second feature input based on the first output.

At step 1210, process 1200 receives (e.g., using one or more components of system 200 (FIG. 2)) a first output from the first machine learning model. For example, the system may receive a first output from the first machine learning model, wherein the first output comprises the user characteristic and an additional user characteristic. For example, the first output may comprise optimal values for each point based on the historical data.

At step 1212, process 1200 generates (e.g., using one or more components of system 200 (FIG. 2)) a second feature input based on the first output. In some embodiments, the first feature input includes banded and raw values. For example, some values may be banded (e.g., fall within a range) as well as some raw values (e.g., unbanded values). In some embodiments, the system may further standardize values in a feature input in order to prevent bias from being introduced.

At step 1214, process 1200 inputs (e.g., using one or more components of system 200 (FIG. 2)) the second feature input into a second machine learning model. For example, the system may input the second feature input into a second machine learning model, wherein the second machine learning model is trained to determine respective item characteristics for given requests, for each of the plurality of available items, wherein each of the respective item characteristics is based on the first output and respective item rule sets for each of the plurality of available items. For example, the second machine learning model may comprise a gradient boosting machine, and the gradient boosting machine may comprise XGBoost gradient boosting framework. In some embodiments, the respective item rule sets for each of the plurality of available items comprises a respective performance level and age. Additionally or alternatively, the second machine learning model may be constrained to impose a monotonic relationship between the second output and the respective item rule sets for each of the plurality of available items.

For example, while a linear programming solver is a powerful algorithm, it cannot solve for a solution until the system has a full data set of the entire portfolio. Accordingly, this would require waiting for an amount of time to collect a portion of portfolio data and then run linear programming on that data. However, waiting a full cycle of time, which may comprise a month, in order to create a full data set means that the prior solution could not provide real-time results. In embodiments such as those discussed in FIGS. 3-4, the system may need to generate real-time recommendations without a full data set. Accordingly, the system may run this optimization process in real time at an individual observation level, without knowing the relevant attributes of other observations in the same portfolio.

At step 1216, process 1200 receives (e.g., using one or more components of system 200 (FIG. 2)) a second output from the second machine learning model. For example, the system may receive a second output from the second machine learning model.

At step 1218, process 1200 generates (e.g., using one or more components of system 200 (FIG. 2)) a recommendation based on the second output. For example, the system may generate for display, on a user interface, a first recommendation for a first item characteristic for a first item of the plurality of available items based on the second output. In some embodiments, the system may receive a user selection of the first item for the request and process the request using the first item based on the user selection. Additionally or alternatively, the system may generate for display, on the user interface, a second recommendation for a second item characteristic for a second item the plurality of available items based on the second output, wherein the second recommendation is displayed simultaneously with the first recommendation.

It is contemplated that the steps or descriptions of FIG. 12 may be used with any other embodiment of this disclosure. In addition, the steps and descriptions described in relation to FIG. 12 may be done in alternative orders, or in parallel to further the purposes of this disclosure. For example, each of these steps may be performed in any order, or in parallel, or substantially simultaneously to reduce lag or increase the speed of the system or method. Furthermore, it should be noted that any of the devices or equipment discussed in relation to FIGS. 1-6 could be used to perform one or more of the steps in FIG. 12.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

1. A method, the method comprising: retrieving a plurality of available domains; receiving a processing request, wherein metadata for the processing request includes a processing characteristic; inputting the processing request into a machine learning model, wherein the machine learning model is trained to determine respective processing loads for given processing requests for each of the plurality of available domains, wherein each of the respective processing loads is based on the plurality of processing characteristics and respective domain rule sets for each of the plurality of available domains; receiving an output from the machine learning model; and generating for display, on a user interface, a recommendation for a first processing load for a first domain of the plurality of available domains based on the output.

2. A method, the method comprising: retrieving a plurality of available domains; receiving a processing request, wherein metadata for the processing request includes a processing characteristic; generating a first feature input based on the metadata; inputting the first feature input into a first machine learning model, wherein the first machine learning model is trained to determine additional processing characteristics based on historical processing data and known processing characteristics; receiving a first output from the first machine learning model, wherein first output comprises the processing characteristic and an additional processing characteristic; generating a second feature input based on the first output; inputting the second feature input into a second machine learning model, wherein the second machine learning model is trained to determine respective processing loads, for given processing requests, for each of the plurality of available domains, wherein each of the respective processing loads is based on the first output and respective domain rule sets for each of the plurality of available domains; receiving a second output from the second machine learning model; and generating for display, on a user interface, a first recommendation for a first processing load for a first domain the plurality of available domains based on the second output.

3. A method, the method comprising: retrieving a plurality of available domains; receiving a processing request from a first user account, wherein metadata for the processing request includes a plurality of processing characteristics; generating a first feature input based on the metadata; inputting the first feature input into a first machine learning model, wherein the machine learning model is trained to determine respective processing load variables for each processing characteristic of the plurality of processing characteristics based on respective domain rule sets for each of the plurality of available domains; receiving a first output from the first machine learning model, wherein first output comprises the respective processing load variables for each processing characteristic of the plurality of processing characteristics; generating a second feature input based on the first output; inputting the second feature input into a second machine learning model, wherein the machine learning model is trained to aggregate the respective processing load variables for each processing characteristic of the plurality of processing characteristics to determine a respective aggregated processing load for each of the plurality of available domains; receiving a second output from the second machine learning model, wherein the second output comprises the respective aggregated processing loads for each of the plurality of available domains; and generating for display, on a user interface, a recommendation of a first aggregated processing load for a first domain of the plurality of available domains based on the second output.

4. A method, the method comprising: retrieving a plurality of available domains; receiving a processing request, wherein metadata for the processing request includes a processing characteristic in a first processing characteristic group; generating a first feature input based on the metadata; inputting the first feature input into a first machine learning model, wherein the first machine learning model is trained to determine additional characteristics based on imputing the additional characteristics using a group level k nearest neighbor algorithm, and wherein reference groups used for imputing the additional characteristics in the second processing characteristic group are fixed across all ranks of the group level k nearest neighbor algorithm; receiving a first output from the first machine learning model, wherein the first output comprises the processing characteristic and an additional processing characteristic; generating a second feature input based on the first output; inputting the second feature input into a second machine learning model, wherein the second machine learning model is trained to determine respective processing loads, for given processing requests, for each of the plurality of available domains, wherein each of the respective processing loads is based on the first output and respective domain rule sets for each of the plurality of available domains; receiving a second output from the second machine learning model; and generating for display, on a user interface, a first recommendation for a first processing load for a first domain the plurality of available domains based on the second output.

5. The method of any one of the preceding embodiments, wherein the second machine learning model comprises a gradient boosting machine.

6. The method of any one of the preceding embodiments, wherein the gradient boosting machine comprises XGBoost gradient boosting framework.

7. The method of any one of the preceding embodiments, wherein the recommendation is provided in real time upon receiving the processing request.

8. The method of any one of the preceding embodiments, further comprising: receiving a user selection of the first domain for the processing request; and processing the processing request using the first domain based on the user selection.

9. The method of any one of the preceding embodiments, further comprising: generating for display, on the user interface, a second recommendation for a second processing load for a second domain the plurality of available domains based on the second output, wherein the second recommendation is displayed simultaneously with the first recommendation.

10. The method of any one of the preceding embodiments, wherein the respective domain rule sets for each of the plurality of available domains comprises a respective performance level and age.

11. The method of any one of the preceding embodiments, wherein the processing characteristic comprises an identity of a user account corresponding to the processing request.

12. The method of any one of the preceding embodiments, wherein the second machine learning model is constrained to impose a monotonic relationship between the second output and the respective domain rule sets for each of the plurality of available domains.

13. The method of any one of the preceding embodiments, wherein the first feature input includes banded and raw values.

14. The method of any one of the preceding embodiments, further comprising: standardizing values in the first feature input.

15. The method of any one of the preceding embodiments, wherein the recommendation is provided in real time upon receiving the processing request.

16. The method of any one of the preceding embodiments, wherein training the first machine learning model comprises: applying a linear program solver to the historical processing data to determine optimal data points for unknown processing characteristics based on the known processing characteristics; and determining the additional processing characteristics based on historical processing data and known processing characteristics.

17. A system comprising means for performing any of the steps as described in any of embodiments 1-16.

18. A tangible, non-transitory, machine-readable medium storing instructions that, when executed by a data processing apparatus, cause the data processing apparatus to perform operations comprising those of any of embodiments 1-16.

19. A system comprising: one or more processors; and memory storing instructions that, when executed by the processors, cause the processors to effectuate operations comprising those of any of embodiments 1-16.

What is claimed is:

1. A system for multi-stage request routing using non-monotonic and monotonic models to execute a request-indicated server task via a model-output-indicated domain, the system comprising:

one or more processors and memories storing instructions that, when executed by the one or more processors, cause operations comprising:

in connection with a request having a processing characteristic, routing the request for processing using both non-monotonic and monotonic machine learning models to obtain a domain indication for the request by:

inputting a first feature input derived from the processing characteristic of the request into a first machine learning model to obtain a first domain-indicative output (i) indicating a first domain and (ii) comprising the processing characteristic and an additional processing characteristic, wherein the first machine learning model (i) is not constrained to impose a monotonic relationship between domain-indicative outputs and respective domain rule sets for each of a plurality of available domains of a server cluster and (ii) is trained to determine additional processing characteristics based on historical processing data and known processing characteristics, wherein the first machine learning model is trained by applying a linear program solver to the historical processing data to determine data points for unknown processing characteristics based on the known processing characteristics; and after inputting the first feature input into the first machine learning model not constrained to impose the monotonic relationship, inputting a second feature input derived from the first domain-indicative output into a second machine learning model to obtain a second domain-indicative output indicating the first domain, wherein the second machine learning model is constrained to impose the monotonic relationship between domain-indicative outputs and respective domain rule sets for each of the plurality of available domains of the server cluster; and based on the second domain-indicative output, executing, with the first domain, a server task indicated by the request.

2. The system of claim 1, the operations further comprising:

based on the second domain-indicative output, generating for display, on a user interface, a recommendation of the first domain, wherein executing the server task with the first domain comprises executing the server task with the first domain based on a user selection of the first domain in connection with the recommendation of the first domain being displayed on the user interface.

3. A method comprising:

performing, via one or more processors, operations comprising:

in connection with a request having a processing characteristic, inputting a first feature input derived from the processing characteristic of the request into a first machine learning model to obtain a first output indicating a first domain, wherein the first machine learning model (i) is not constrained to impose a monotonic relationship between outputs and respective domain rule sets for each of a plurality of available domains and (ii) is trained to determine additional processing characteristics based on historical processing data and known processing characteristics, wherein training the first machine learning model comprises applying a linear program solver to the historical processing data to determine optimal data points for unknown processing characteristics based on the known processing characteristics;

after inputting the first feature input into the first machine learning model not constrained to impose the monotonic relationship, inputting a second feature input derived from the first output into a second machine learning model to obtain a second output indicating the first domain, wherein the second machine learning model (i) is constrained to impose the monotonic relationship between output and respective domain rule sets for each of the plurality of available domains (ii) is trained to determine respective item characteristics, for given requests, for each domain of a plurality of available server domains, and wherein each of the respective item characteristics is based on the first output and respective item rule sets for each of the plurality of available domains; and based on the second output, executing, with the first domain, a task indicated by the request.

4. The method of claim 3, wherein the second machine learning model comprises a gradient boosting machine.

5. The method of claim 4, wherein the gradient boosting machine comprises XGBoost gradient boosting framework.

6. The method of claim 3, further comprising:

based on the second output, generating for display, on a user interface, a recommendation of the first domain, wherein executing the task with the first domain comprises executing the task with the first domain based on a user selection of the first domain in connection with the recommendation of the first domain being displayed on the user interface.

7. The method of claim 3, wherein the respective item rule sets for each of the plurality of available domains comprises a respective performance level and age.

8. The method of claim 3, wherein the processing characteristic comprises an identity of a user account corresponding to the request.

9. The method of claim 3, wherein the first feature input includes banded and raw values.

10. The method of claim 3, wherein the first output obtained via the first machine learning model comprises the processing characteristic and an additional processing characteristic.

11. One or more non-transitory, computer-readable media comprising instructions that, when executed by one or more processors, cause operations comprising:

in connection with a request having a processing characteristic, inputting a first feature input derived from the processing characteristic of the request into a first machine learning model to obtain a first output indicating a first domain, wherein the first machine learning model (i) is not constrained to impose a monotonic relationship between outputs and respective domain rule sets for each of a plurality of available domains and (ii) is trained to determine additional processing characteristics based on historical processing data and known processing characteristics, wherein the first machine learning model is trained by applying a linear program solver to the historical processing data to determine data points for unknown processing characteristics based on the known processing characteristics;

after inputting the first feature input into the first machine learning model not constrained to impose the monotonic relationship, inputting a second feature input derived from the first output into a second machine learning model to obtain a second output indicating the first domain, wherein the second machine learning model is constrained to impose the monotonic relationship between output and respective domain rule sets for each of the plurality of available domains; and based on the second output, executing a task indicated by the request with the first domain.

12. The one or more non-transitory, computer-readable media of claim 11, wherein the second machine learning model comprises a gradient boosting machine.

13. The one or more non-transitory, computer-readable media of claim 12, wherein the gradient boosting machine comprises XGBoost gradient boosting framework.

14. The one or more non-transitory, computer-readable media of claim 11, the instructions further cause operations comprising:

based on the second output, generating for display, on a user interface, a recommendation of the first domain, wherein executing the task with the first domain comprises executing the task with the first domain based on a user selection of the first domain in connection with the recommendation of the first domain being displayed on the user interface.

15. The one or more non-transitory, computer-readable media of claim 11, wherein the processing characteristic comprises an identity of a user account corresponding to the request.

16. The one or more non-transitory, computer-readable media of claim 11, wherein the first feature input includes banded and raw values.

17. The one or more non-transitory, computer-readable media of claim 11, wherein the first output obtained via the first machine learning model comprises the processing characteristic and an additional processing characteristic.

* * * * *